US010685036B2

(12) United States Patent
Berwick et al.

(10) Patent No.: US 10,685,036 B2
(45) Date of Patent: Jun. 16, 2020

(54) SYSTEM AND METHOD FOR FACILITATING INTERACTIVE DATA VISUALIZATION AND MANIPULATION

(71) Applicant: Deutsche Bank AG, New York, NY (US)

(72) Inventors: Sarah Berwick, Short Hills, NJ (US); Boris Fuzaylov, East Brunswick, NJ (US); Melody Browne, Atlantic Highlands, NJ (US); Thomas Lukoma, Parlin, NJ (US); Yakov Manukyan, East Brunswick, NJ (US)

(73) Assignee: DEUTSCHE BANK AG, New York, NY (US)

( * ) Notice: Subject to any disclaimer, the term of this patent is extended or adjusted under 35 U.S.C. 154(b) by 0 days.

(21) Appl. No.: 16/148,438

(22) Filed: Oct. 1, 2018

(65) Prior Publication Data

US 2019/0034504 A1    Jan. 31, 2019

Related U.S. Application Data

(63) Continuation of application No. 14/730,725, filed on Jun. 4, 2015, now abandoned.
(Continued)

(51) Int. Cl.
*G06F 16/26* (2019.01)
*G06F 3/0484* (2013.01)
(Continued)

(52) U.S. Cl.
CPC .......... *G06F 16/26* (2019.01); *G06F 3/0482* (2013.01); *G06F 3/04817* (2013.01);
(Continued)

(58) Field of Classification Search
CPC ...... G06F 3/0482; G06F 3/017; G06F 3/0481; G06F 3/0488; G06F 3/0216; G06F 17/30265; G06F 3/04886; G06F 3/048
See application file for complete search history.

(56) References Cited

U.S. PATENT DOCUMENTS 7,606,835 B2    10/2009   Laaser et al.
8,024,651 B1    10/2011   Error
(Continued)

OTHER PUBLICATIONS

Transmittal; International Search Report; and Written Opinion of the International Searching Authority for International Application No. PCT/US2015/034348 dated Aug. 24, 2015.

*Primary Examiner* — Toan H Vu
(74) *Attorney, Agent, or Firm* — Katten Muchin Rosenman LLP

(57) ABSTRACT

An interactive system having a processor configured to execute computer instructions stored to said memory device, wherein said processor receives, via a communication device, data from one or more data sources, wherein said processor generates, via a display, a graphical user interface having a first visualization area and a second visualization area, wherein said processor generates a first data visualization based at least in part on the received data, the first data visualization being displayed at said first visualization area, wherein the first data visualization comprises a plurality of user-selectable regions, each user-selectable region represented a subset of the received data, wherein, in response to selection of a user-selectable region, said processor generates a second data visualization based at least in part on the selected user-selectable region's user-selectable region, the second data visualization being displayed at said second visualization area.

33 Claims, 22 Drawing Sheets

Related U.S. Application Data

(60) Provisional application No. 62/008,347, filed on Jun. 5, 2014.

(51) Int. Cl.
*G06F 3/0482* (2013.01)
*G06F 3/0481* (2013.01)
*G06F 16/28* (2019.01)
*G06Q 10/06* (2012.01)

(52) U.S. Cl.
CPC ...... *G06F 3/04842* (2013.01); *G06F 3/04845* (2013.01); *G06F 16/287* (2019.01); *G06Q 10/06393* (2013.01)

(56) References Cited

U.S. PATENT DOCUMENTS

| | | |
|---|---|---|
| D699,251 S | 2/2014 | Rao et al. |
| 8,683,370 B2 | 3/2014 | Marchand et al. |
| 2003/0071814 A1 | 4/2003 | Jou et al. |
| 2008/0109740 A1 | 5/2008 | Prinsen et al. |
| 2010/0085416 A1 | 4/2010 | Hegde et al. |
| 2010/0192103 A1 | 7/2010 | Cragun et al. |
| 2011/0047014 A1* | 2/2011 | De Angelo ........... G06F 3/0482 705/14.4 |
| 2011/0066981 A1* | 3/2011 | Chmielewski ........ G06F 3/0482 715/834 |
| 2012/0159359 A1* | 6/2012 | Ehrler .................. G06F 3/0481 715/763 |
| 2013/0047123 A1 | 2/2013 | May et al. |
| 2013/0104079 A1* | 4/2013 | Yasui .................. G06F 3/0482 715/834 |
| 2013/0127911 A1* | 5/2013 | Brown ................ G06F 3/04886 345/649 |
| 2013/0132904 A1* | 5/2013 | Primiani .............. G06F 3/048 715/834 |
| 2013/0167060 A1* | 6/2013 | Wang .................. G06F 3/0488 715/769 |
| 2013/0234949 A1* | 9/2013 | Chornenky .......... G06F 3/0216 345/169 |
| 2013/0275904 A1 | 10/2013 | Bhaskaran et al. |
| 2014/0043337 A1 | 2/2014 | Cardno |
| 2014/0047361 A1 | 2/2014 | Gaspar et al. |
| 2014/0082546 A1 | 3/2014 | Yang |
| 2014/0189553 A1* | 7/2014 | Bleizeffer ......... G06F 17/30265 715/765 |
| 2014/0223373 A1* | 8/2014 | Reed .................... G06F 3/0488 715/823 |
| 2014/0344754 A1* | 11/2014 | Lai ...................... G06F 3/0481 715/830 |
| 2014/0380223 A1* | 12/2014 | Counsell .............. G06F 3/017 715/773 |
| 2015/0346921 A1* | 12/2015 | Erad .................... G06F 3/0482 715/738 |

\* cited by examiner

Figure 7d

SYSTEM AND METHOD FOR FACILITATING INTERACTIVE DATA VISUALIZATION AND MANIPULATION

This application is a continuation of U.S. patent application Ser. No. 14/730,725, filed Jun. 4, 2015, which is a non-provisional of U.S. Patent Appln. No. 62/008,347, filed Jun. 5, 2014 the contents of all incorporated herein by reference.

TECHNICAL FIELD

The present invention relates to systems and methods for data visualization and data management. More specifically, the present invention relates to systems and methods for data visualization and data management for allowing users to view and compare data relating to a financial institution.

BACKGROUND

In an increasingly competitive business environment, entities of all types and as diverse as financial institutions, healthcare providers, manufacturers and online companies, continuously gather, generate, and manage data. In doing so, these business entities ever-increasingly amass enormous volumes of data, often on a daily, or even minutely, basis. As the volume of collected data grows, business entities need to develop and improve systems and methods of effectively managing the data and making it usable for its intended audiences. To that end, over the past decade, numerous advancements have been made with regard to data management and data visualization techniques. For example, various business intelligence and data visualization tools have been developed to help transform large amounts of raw numeric data into spreadsheets, graphs, images, and other more easily digestible forms. Further, with the advancements in modern computing devices, these business entities are able to provide mobile computing, thereby obviating the need for the user to be in their office, or otherwise tethered to a particular location, as was once required with bulky desktop computer systems. For example, mobile devices (e.g., laptops, smartphones, and tablet computers) have made it possible to have a powerful computing device available from virtually any location. However, these devices alone do not make it any easier to consume the vast amount of information that most users receive. Moreover, mobile devices often employ smaller screens, thus, it can be difficult to view large amounts of data.

Accordingly, despite the advancements in the field data visualization and data management, a need remains for an improved data visualization and data management system, especially as they relate to datasets that need to be presented to the user in multiple dimensions. A need also exists for an improved data visualization and data management system that may be adapted for mobile devices, including those having smaller displays.

SUMMARY OF THE INVENTION

The present disclosure is directed to an interactive data visualization system, apparatus, and method.

According to a first aspect of the present invention, an interactive visualization system for presenting information comprises: a data device; a communication device configured to communicate data over a communication network; a display; a user input device, the user input device being configure to receive an input from a user; a processor operatively coupled to a memory device, said data device, said communication device, said display, and user input device, wherein said processor is configured to execute computer instructions stored to said data device, wherein said processor identifies a dataset from data received, via said communication device, from one or more data sources, wherein said processor processes said computer instructions to render a data visualization graphical user interface on the display, the data visualization graphical user interface having a first visualization area and a second visualization area, wherein said processor renders a first data visualization element and a second data visualization element based at least in part on the dataset, the first data visualization element being displayed at said first visualization area, and the second data visualization element being displayed at said second visualization area, wherein the first data visualization element comprises a plurality of user-selectable regions, each of said plurality of user-selectable regions representing a portion of the dataset, wherein said processor re-renders the first data visualization element and the second data visualization element in response to the user selecting a first user-selectable region, wherein the first data visualization element and the second data visualization element are dynamically re-rendered based at least in part on a portion of the dataset represented by the selected first user-selectable region.

In certain aspects, the first data visualization element is a multi-dimensional donut or a data table.

In certain aspects, the multi-dimensional donut comprises a center region and a plurality of concentric rings axially disposed around the center portion. Each of said plurality of concentric rings may represent a data visualization component or a description label for each portion of the dataset. Specifically, the plurality of concentric rings may comprise: a first concentric ring that renders a data visualization component for each of said portions of the dataset; a second concentric ring that renders a numeric value for each of said portions of the dataset, said numeric value corresponding to the data visualization component; a third concentric ring that displays a description label for each of said sub-categories; and a fourth concentric ring that displays a dimensional category label for each of said clusters. The center region may numerically represent a total amount for a dataset being represented by the multi-dimensional donut at a given time, the total amount being substantially equal to the sum of each sub-category within a dimensional category at the given time. The second data visualization element may comprise one or more detailed data tables.

In certain aspects, the plurality of user-selectable regions, each user-selectable region representing a sub-category, are grouped into a first plurality of clusters, each cluster representing a dimensional category. Specifically, the plurality of user-selectable regions within a cluster may be radially arranged around the center portion in a predetermined sorting order. The predetermined sorting order may be: (1) alphabetically by description label; (2) ascending, by numeric value; or (3) descending, by numeric value.

In certain aspects, the data visualization graphical user interface may comprise a flip icon, whereby selecting said flip icon causes said processor to re-render the first data visualization element with a second plurality of clusters, in lieu of the first plurality of clusters.

In certain aspects, the selected first user-selectable region may be selected from a cluster chosen from said first plurality of clusters, and a second user-selectable region may be selected from a cluster chosen from said second plurality of clusters.

In certain aspects, the first data visualization element and the second data visualization element may be dynamically re-rendered based at least in part on a portion of the dataset represented by the selected first user-selectable region and the selected second user-selectable region.

In certain aspects, the data visualization graphical user interface may comprise a filter selector element, the filter selector element being configured to apply a desired filter to said first data visualization element or said second data visualization element.

In certain aspects, the one or more of said plurality of concentric rings may be gradually rendered about a center axis positioned at the center region's center.

In certain aspects, the data visualization graphical user interface comprises a dimension cross selector element having a plurality of rows intersecting a plurality of columns, each of said plurality of rows and each of said plurality of columns representing a dimensional category, whereby the user identifies the first dimensional category and the second dimensional category by selecting the point whereby a desired first dimension intersects a desired second dimension.

DESCRIPTION OF THE DRAWINGS

These and other advantages of the present invention will be readily understood with reference to the following specifications and attached drawings wherein:

FIG. 7b illustrates an example detailed view window of the data periodic table of FIG. 7a;

FIG. 7c illustrates an example detailed view of the tile portion of the data periodic table of FIG. 7a;

FIG. 7d illustrates an example data visualization element represented in the form of a populated data periodic table;

DETAILED DESCRIPTION

Figure 1A:
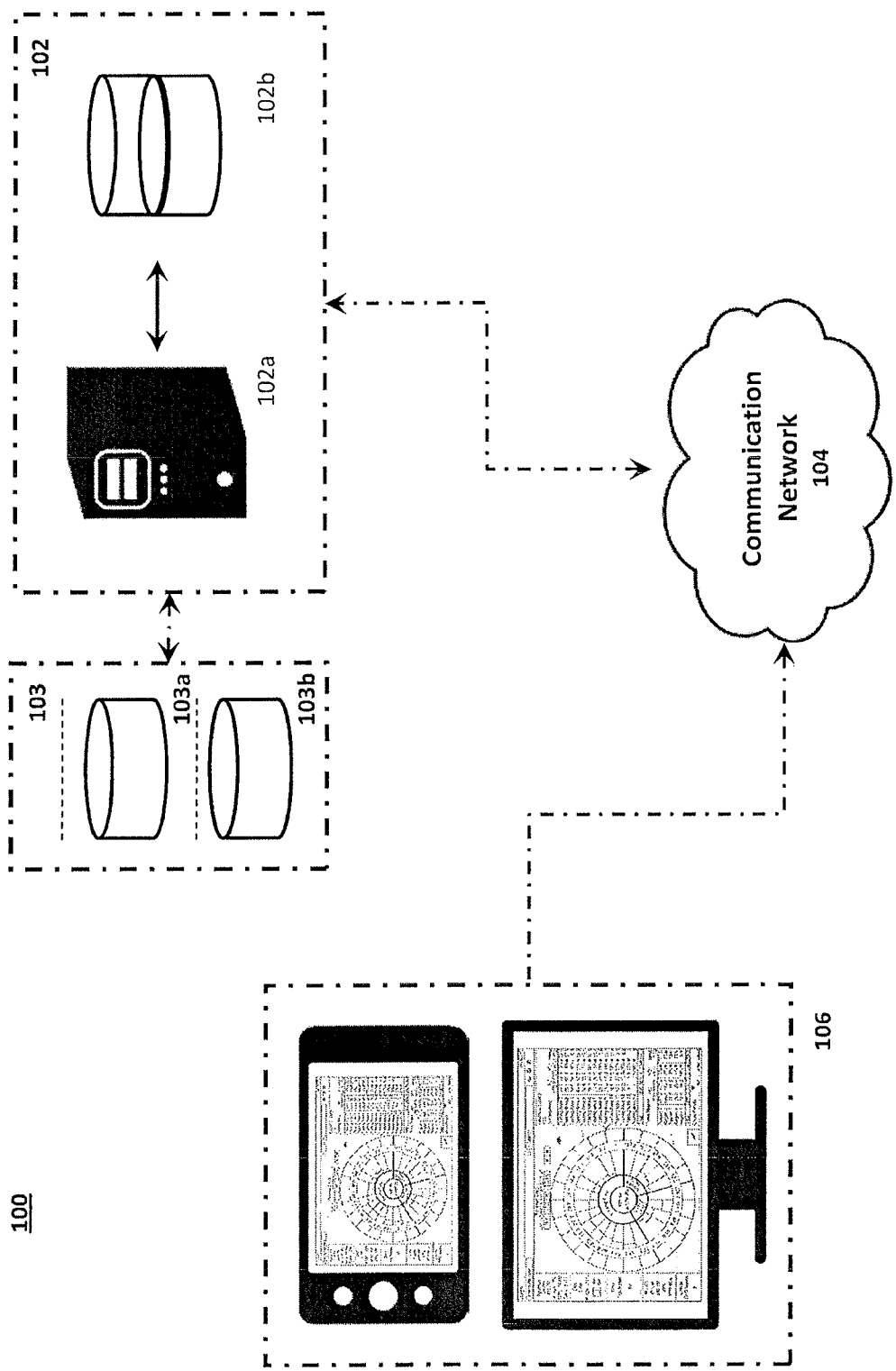
FIG. 1a illustrates a computer system and network configured to facilitate a data visualization and data management system and method.

Preferred embodiments of the present invention will be described hereinbelow with reference to the accompanying drawings. In the following description, well-known functions or constructions are not described in detail because they may obscure the invention in unnecessary detail. The present invention relates to systems and methods for data visualization and data management. For this disclosure, the following terms and definitions shall apply:

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "coupled," "coupled to" and "coupled with" as used herein, each mean a relationship between or among two or more devices, apparatuses, files, circuits, elements, functions, operations, processes, programs, media, components, networks, systems, subsystems, and/or means, constituting any one or more of (i) a connection, whether direct or through one or more other devices, apparatuses, files, circuits, elements, functions, operations, processes, programs, media, components, networks, systems, subsystems, or means, (ii) a communications relationship, whether direct or through one or more other devices, apparatuses, files, circuits, elements, functions, operations, processes, programs, media, components, networks, systems, subsystems, or means, and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an email, a message, a document, a report, or a list, or in any other form.

The term "network" as used herein includes both networks and inter-networks of all kinds, including the Internet, and is not limited to any particular network or inter-network.

The term "processor" as used herein means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing.

FIG. 1a illustrates a computer system and network configured to facilitate a data visualization and data management system and associated methods. As illustrated, the computer system 100 may comprise a communication network 104 (e.g., the Internet) that is communicatively coupled, via one or more data transmission devices, with, for example, a data management server 102, and one or more computing devices 106. In certain aspects, the data management server 102 may be configured to receive data and, therefore, may be communicatively coupled with one or more non-transitory data storage devices having databases embodied thereon, such as a data source 103. The one or more non-transitory data storage devices may be associated with a remote data source 103a or a third-party data source 103b. The one or more non-transitory data storage devices may be used to provide additional data, or to update data, as needed (e.g., periodically, or as a real-time data feed). The data transmission device may be a wireless data device, such as a wireless transceiver, a wired connection, or a combination thereof. Example computing devices 106 include desktop computers, and mobile devices, such as smart phones (i.e., mobile phones with more advanced computing capability and connectivity than basic feature phones), tablet computers, laptop computers, etc.

While the communication network 104 is illustrated as a single network, one of skill in the art would recognize that one or more communication networks may be used to facilitate communication between the various components of the computer system 100. Further, the data transmission device may employ an encrypted communication channel, such as Transport Layer Security and Secure Sockets Layer, to communicate data between, for example, the computing devices 106, the data management server 102 and the data source 103. Thus, the communication channel may employ one or more encryption methods, such a hashing, symmetric cryptography, and asymmetric cryptography.

The data management server 102 may be used to facilitate, gather, generate, and/or manage one or more data volumes associated with a business entity (or group of entities) to define a dataset. An exemplary data management server 102 may comprise a processor (e.g., via computer 102a) configured to perform one or more algorithms/protocols and a non-transitory data storage device 102b. The computer 102a may be communicatively and operatively coupled with one or more non-transitory data storage devices 102b, which may be a non-transitory, computer-readable medium having one or more databases and/or computer-executable instructions embodied therein. The computer-executable instructions, when executed by the computer, facilitate various data calculations and protocols employed in facilitating data visualization and data management techniques, and for receiving and/or transmitting data over the communication network 104 and/or with the remote data source 103a or the third-party data source 103b. The non-transitory data storage device 102b may be further configured to store data about one or more users. For example, computer 102a may be configured to track and/or log the activities, location, and/or user history of a particular computing device 106 in the computer system 100 (e.g., to track a particular user or user account).

Figure 1B:
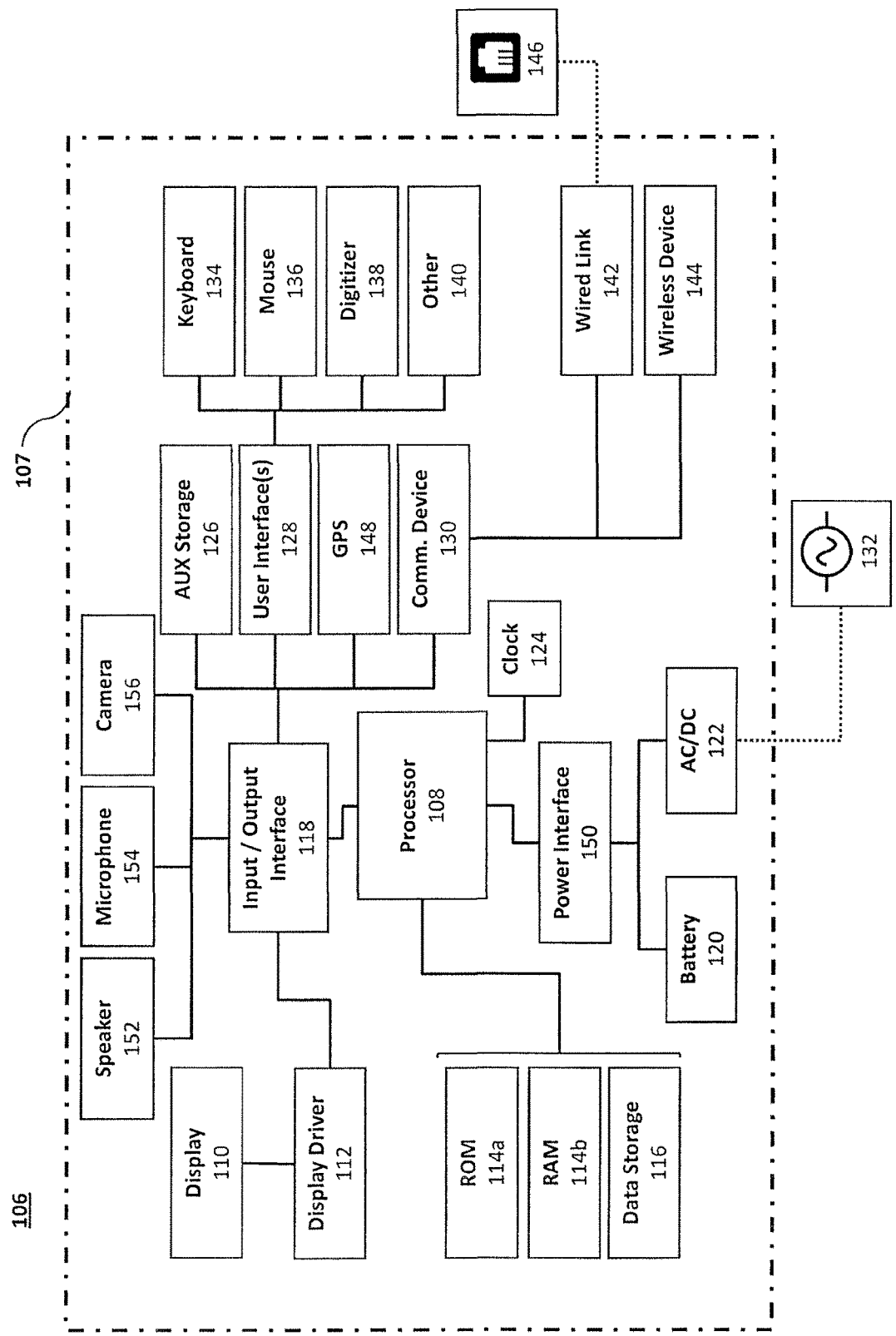
FIG. 1b illustrates an example computing device for use with a data visualization and data management system.

FIG. 1b illustrates an example computing device for use with a data visualization and data management system. Specifically, FIG. 1b illustrates a computing device 106 having a processor 108 (e.g., a central processing unit (CPU)) that is operatively coupled to a read only memory (ROM) 114a for receiving one or more instruction sets, to a random access memory (RAM) 114b having a plurality of buffers for temporarily storing and retrieving information, and to an internal data device 116 (e.g., a hard drive, such a solid state drive or other non-volatile data storage device). A clock 124 is also coupled to the processor 108 for providing clock or timing signals or pulses thereto. Those skilled in the art will understand that the computing device 106 includes one or more bus structures for interconnecting its various components. Further, to increase ease of use in mobile applications, the various components of a mobile computing device 106 may be housed in a single housing 107 having a single unit (e.g., a tablet computer), or multiple units (e.g., a hinged clamshell computer).

As illustrated, the processor 108 may be operatively coupled to a display screen 110 via a display driver 112. In operation, the display driver 112 may receive data (e.g., video data) from the processor 108 via input/output interface 118 and display that video data on the display screen 110, such as a liquid crystal display (LCD) screen. The display screen 110 may further comprise a thin layer of sensing circuitry present either beneath the visible portion of display screen 110's surface, or as part of a thin, clear membrane overlying the display screen 110 that is sensitive to the position of a pen or finger on its surface. This touch screen functionality device will be generally referred to herein as a digitizer 138, and, as discussed below, may serve as a user input device. As described in more detail below, the processor 108 may generate (e.g., via an application program), and cause to be displayed on the display screen 110, a graphical user interface (GUI), having one or more elements, such as data entry fields, text boxes, images, user-selectable icons, user-selectable fields, interactive visualization areas, and the like. To facilitate an interactive data visualization system in accordance with the present data visualization and data management system, the internal data device 116 may further comprise a rendering engine configured to receive marked up data content (e.g., HyperText Markup Language (HTML), Extensible Markup Language (XML), image files, etc.) and formatting information (such as Cascading Style Sheets (CSS), Extensible Stylesheet Language Family (XSL), etc.), and to display the formatted content on the display screen 110. The rendering engine may be embedded in, for example, an application such as web browsers, a stand-alone data visualization application, or other applications for facilitating the displaying of marked up data content. For example, in one aspect, the data management and data visualization techniques taught herein may be written in a markup language (e.g., HTML5), and processed using a processor configured to rendered the markup language using a web browser.

The computing device 106 may further include an input/output interface 118 that interfaces the processor 108 with one or more peripheral and/or communicative devices, such as an auxiliary data device 126, a user interface device controller 128, a Global Positioning System (GPS) transmitter 148, a communication interface device 130, speaker 152, microphone 154, and/or camera 156.

The auxiliary data device 126 may be used to store data that may be too large for the internal data device 116, or where it is preferably to keep certain data separate and/or apart from internal data device 116. The auxiliary data device 126 may be integrated with the computing device 106, or removable. For example, the auxiliary data device 126 may be removably and operatively coupled with the computing device 106 via a data connecter (e.g., a Universal Serial Bus (USB) connector). Examples of such auxiliary storage devices 126 may include, for example, hard drives, flash drives, disk reader/writers, etc.

The user interface device controller 128 may be configured to manage user command signals between the processor and one or more user input devices, such as a keyboard 134, a mouse 136, a digitizer 138 (whether a touch pad, or transparent layer overlaying the display screen 110), and other input devices 140. Using the digitizer 138, a user may control or interact with the computing device 106 by writing, drawing, or tapping on the display screen 110 using, a pen, stylus, or finger. In addition, or in lieu of the mice and keyboards, the interactive data visualization system may employed a touch-based interaction device or system, including, without limitation, any types of touch forms of input, such as touch with the user's finger, use of a stylus or digitizer, or other types of highly interactive input (e.g., voice or optical user interface). Other input devices 140 may include, for example, a voice command device (and appropriate software) that enables a user to control the computing device 106 by means of the human voice (i.e., spoken word or sound), and an optical command device that enables a user to control the computing device 106 by means of human pupil (i.e., of the eye) tracking. Thus, in addition to being used to output/record general audio/imagery, the speaker 152, microphone 154, and/or camera 156 may be further controlled, or used, by said user interface device controller 128 as, or to facilitate, an input/output user control means.

The GPS transmitter 148 may be used to track and/or monitor the location of the computing device 106, and to relay the location information in the form of positional data (e.g., geographic coordinate system data) to the data management server 102 or another device in computer system 100 or via the communication network 104. For example, as noted above, the computer 102a may be configured to track the activities, location, and/or user history of a particular computing device 106 in the computer system 100. The positional data may also be locally stored to the computing device 106 (e.g., to internal data device 116 or auxiliary data device 126).

The communication controller 130 may be configured to manage communication and/or transmission of signals or data between the processor and another device (e.g., via communication network 104 or directly with another device, such as a second computing device 106). The communication controller 130 may be, for example, a modem or other transceiver. Further, the communication controller 130 may be configured to communicate data via a wired link 142 (e.g., an Ethernet/USB port capable of being wiredly coupled with another Ethernet/USB port 146 positioned outside the computing device 106), and/or a wireless device 144 (e.g., a wireless transceiver configured to communicate via one or more wireless standards such as Bluetooth (e.g., short-wavelength ultra high frequency (UHF) radio waves in the industrial, scientific and medical (ISM) band from 2.4 to 2.485 GHz), near field communication (NFC), Wi-Fi (e.g., Institute of Electrical and Electronics Engineers' (IEEE) 802.11 standards), etc.).

The computing device 106 may receive power needed to operate the computing device 106 (and components thereof) from power interface device 150. The power interface device 150 may be configured to receive power from one or more sources and to direct it as-needed to the computing device 106's components. For example, the power interface device 150 may be electrically coupled with a battery 120 (e.g., a rechargeable lithium ion battery for outputting a direct current (DC)) or electrically coupled with an alternative current (AC) power source 132 located outside the housing 107 (e.g., a wall outlet) via an AC-to-DC converter 122. While the AC-to-DC converter 122 is illustrated as being positioned inside the computer device's 106 housing, one of skill in the art would appreciate that the AC-to-DC converter 122 may be positioned outside the housing (e.g., as part of the power cord). Further, the AC-to-DC converter 122 may be integrated with the power interface device 150.

While the computing device 106 of FIG. 1b is suitable for use with the presently disclosed interactive data visualization system, a suitable mobile computing device is also described by U.S. Pat. No. 7,564,995 by Larry S. Yaeger. Further, other suitable mobile computing devices for use with the present system include the Apple iPad® from Apple Inc. of Cupertino, Calif. and the Galaxy® Tablet from Samsung Electronics Co., Ltd. of Suwon, South Korea.

Upon launching the interactive data visualization system via, for example, a computing device 106 having a rendering engine, the interactive data visualization system may direct the user to a default page. The default page may be customized by the user (e.g., upon landing, the user is automatically redirected to a user-selected predetermined page), or, in the alternative, the user may be directed to a preset default page, which may serve as a landing page (e.g., a home page).

Figure 2A:
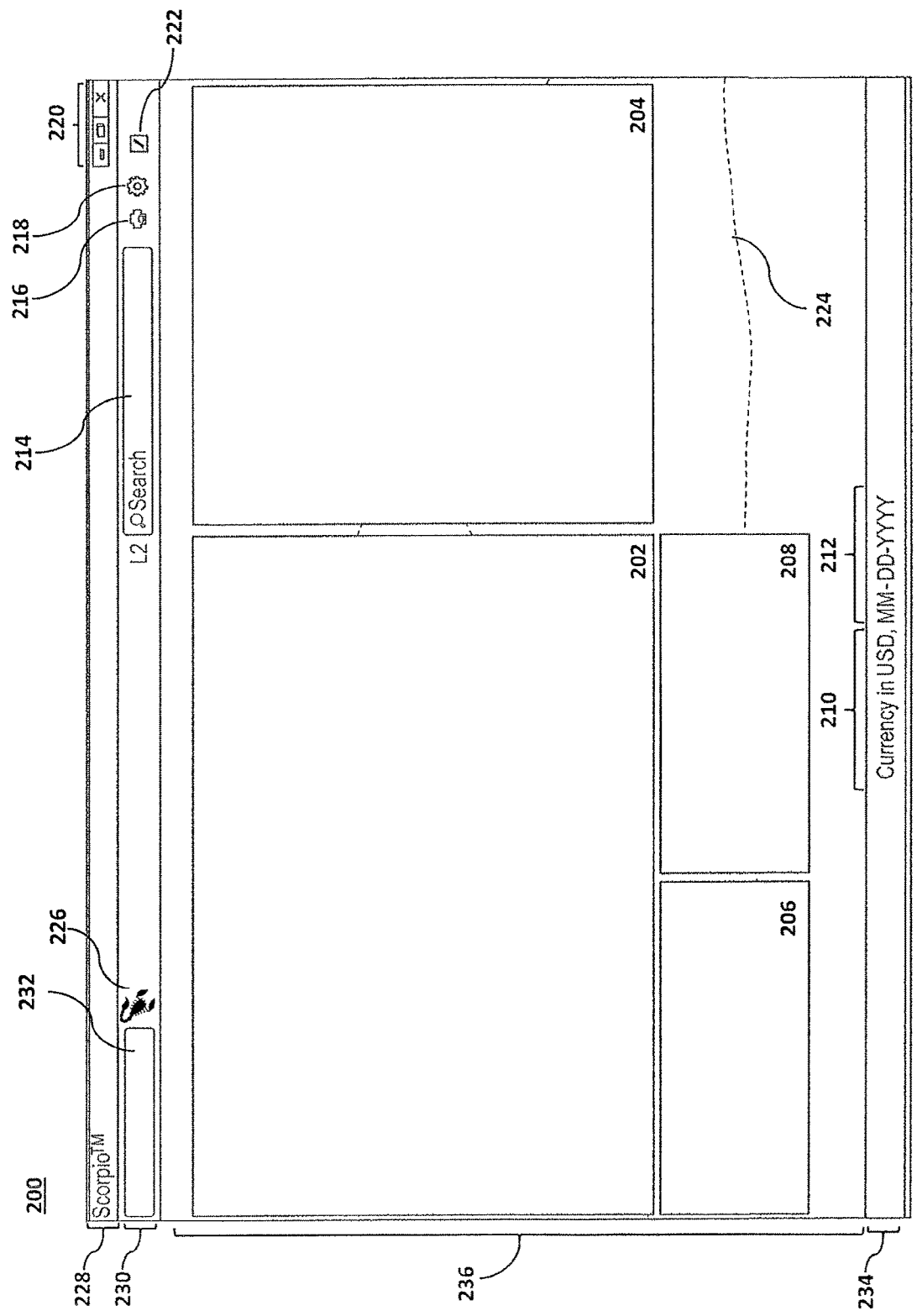
FIGS. 2a and 2b illustrate an example landing page of a data visualization and data management system.

FIG. 2a illustrates an example unpopulated landing page 200 of a data visualization and data management system. The landing page 200 of FIG. 2a is illustrated as being unpopulated for ease of understanding and illustration. That is, by unpopulated, the various visualization areas are illustrated as blank (i.e., the data values and certain visualizations are omitted) and are only illustrated via the element's bounding boxes, which define the boundaries of the element.

As will be appreciated, the various pages of the data visualization and data management system may comprise certain common elements and features. Accordingly, for brevity, certain of these common elements and features will be described only with regard to the landing page 200 (or as they are introduced, first illustrated), however it should be appreciated that these common elements and/or features, unless stated otherwise, function in a substantially similar manner for the remaining pages, even if not explicitly addressed or illustrated for that page. For example, the data visualization and data management system may employ common elements and features such as a page header 228, a toolbar 230, a central area 236, and a page footer 234, each of which may comprise a plurality of elements, certain of which are user selectable via the GUI and user interface device. However, depending on the nature of the page being displayed, certain elements may be added, removed, or deactivated (and possibly illustrated as being greyed out) where appropriate. Moreover, the various elements may be arranged on a particular page as desired for a particular application. Therefore, the present teachings should not be viewed as being limited to the arrangement (e.g., of elements or other features) as depicted or described herein.

As illustrated, the page header 228 may provide, for example, the name of the data visualization and data management system (e.g., "Scorpio™"), as well as window control buttons 220 (e.g., minimize, maximize, close). The toolbar 230 may provide, for example, a current page view description 232, a home icon 226, a search bar 214, a print icon 216, a setting icon 218, and a refresh icon 222. Specifically, the current page view description 232 may provide a brief description of the type of dataset (or portion thereof) being displayed or accessed. Selecting the home icon 226, which may be illustrated as a word or icon, redirects the user to a predetermined screen (e.g., a default page or landing page). The home icon 226 may also serve as a back button, thereby returning to a prior page or to remove filters (e.g., one at a time, such as last in, last out) applied to the dataset (e.g., the filters of multi-dimensional donut 400 and data table 500). Alternatively, the back button may be provided as an icon separate and apart from the home icon 226. The search bar 214 may enable the user to search the data visualization and data management system, specific dataset, or the like, for a keyword or value. Selecting the refresh icon 222 may cause the various elements to update, thereby reflecting any new or revised data. During a refresh, the refresh icon 222 may spin or rotate to indicate that a refresh is in progress. Finally, as is generally known, the print icon 216 and a setting icon 218 may cause a new window to open, thereby enabling the user to, respectively, print what is being displayed (or portion thereof), or to change certain system settings (or user preferences) in the data visualization and data management system. Further, the user may be able to rearrange the layout of the landing page 200 by selecting (e.g., clicking or tapping) and dragging the various elements to a desired location via a user input device.

The central area 236 generally represents the largest region of a given window and, as will be discussed, typically provides the primary content for a particular page. In certain aspects, it may be desirous to provide a graphic 224 at central area 236. The graphic 224 being set behind the various elements so as to not obstruct the content being displayed. For example, as illustrated throughout certain of the Figures, the graphic 224 may be a mountain; the profile of which is illustrated in broken lines.

As illustrated with regard to the landing page 200, the central area 236 may comprise a plurality of elements, such as visualization areas and information tiles, each of which may represent a particular dataset (e.g., a category of data), or portion thereof. For example, landing page 200 may provide a first visualization area 202, a second visualization area 204, a first information tile 206, and a second information tile 208. Each of the visualization areas and information tiles of landing page 200 may provide a general summary of its corresponding dataset (e.g., a data visualization element), whereby the visualization areas and information tiles of landing page 200 are preferably user selectable such that, upon selecting a specific visualization area or information tile (e.g., clicking, tapping, or otherwise selecting via a user input device), the user is redirected to another page that provides additional information related to the dataset of the selected visualization area or information tile. For example, selecting the first visualization area 202 may redirect the user to a dashboard page, such as dashboard page 300, while selecting the second visualization area 204 will redirect the user to a data periodic table, such as data periodic table 700. In certain aspects, it may be desirous to provide a page footer 234 having the units 210 for data values presently being illustrated on the page, and/or the date and time 212 (which may be the current date/time, or date/time of the more recent data update).

Example 1

Figure 2B:
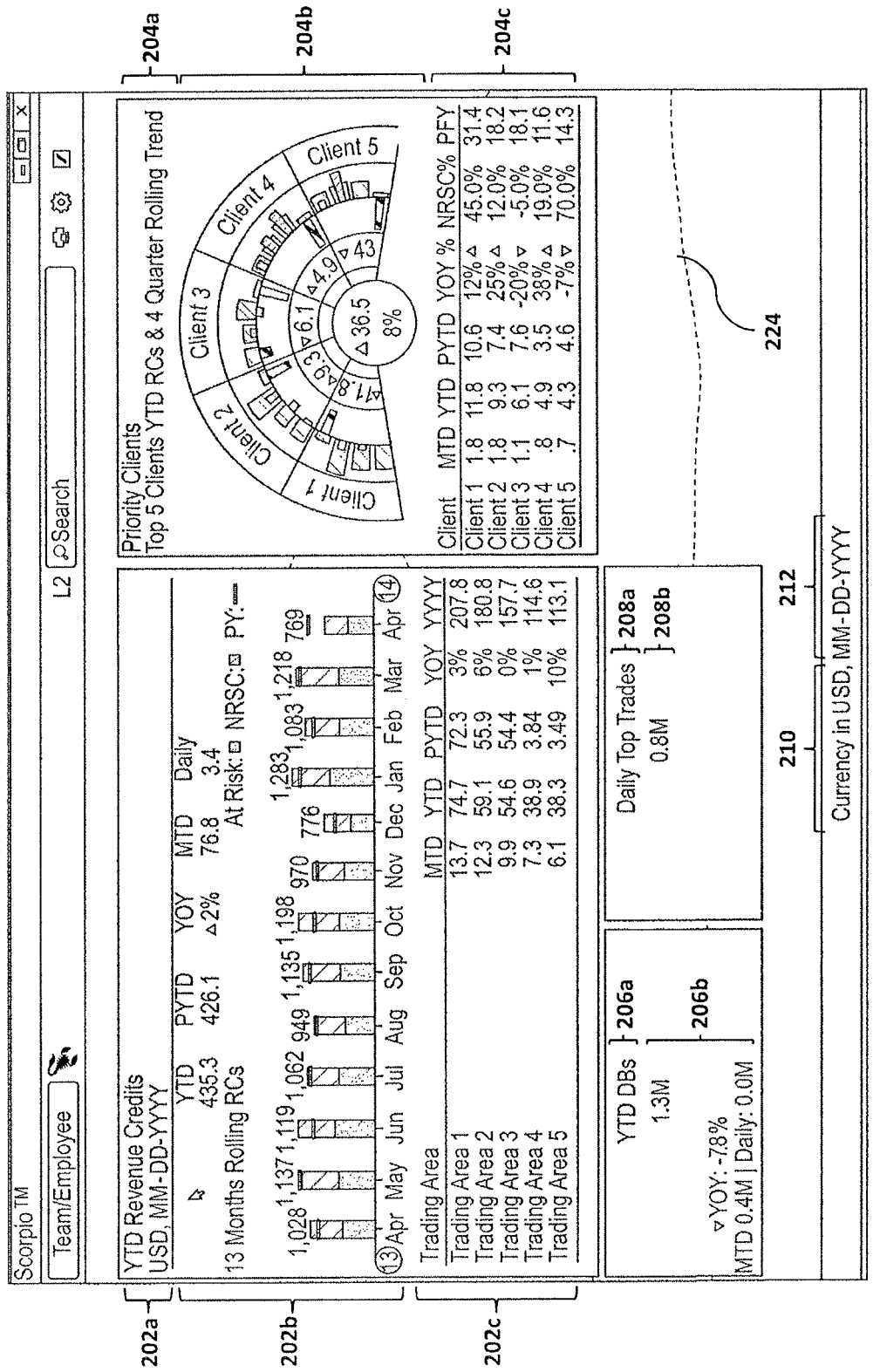

To provide an overview, the present invention may be illustrated by the Example illustrated in FIG. 2b. This Example is provided to aid in the understanding of the invention and is not to be construed as a limitation thereof. Specifically, FIG. 2b illustrates an example populated landing page 200 of a data visualization and data management system. As illustrated, the first visualization area 202 and second visualization area 204 each illustrate a title region 202a, 204a and a data visualization element, specifically, a trend chart 202b, and a fan chart 204b, and a data table 202c, 204c. Generally, the data visualization elements employed by the data visualization system may be dynamically updated and interactive, that is, they may contain user-selectable regions. Similarly, the first information tile 206 and the second information tile 208 provide a title region 206a, 208a and textual element 206c, 208c. The textual element may comprise plain text (e.g., 208b) or further include a graphic (e.g., the trend indicator icon, ▼ or ▲, of 206b).

Dashboard Page 300.

Figure 3A:
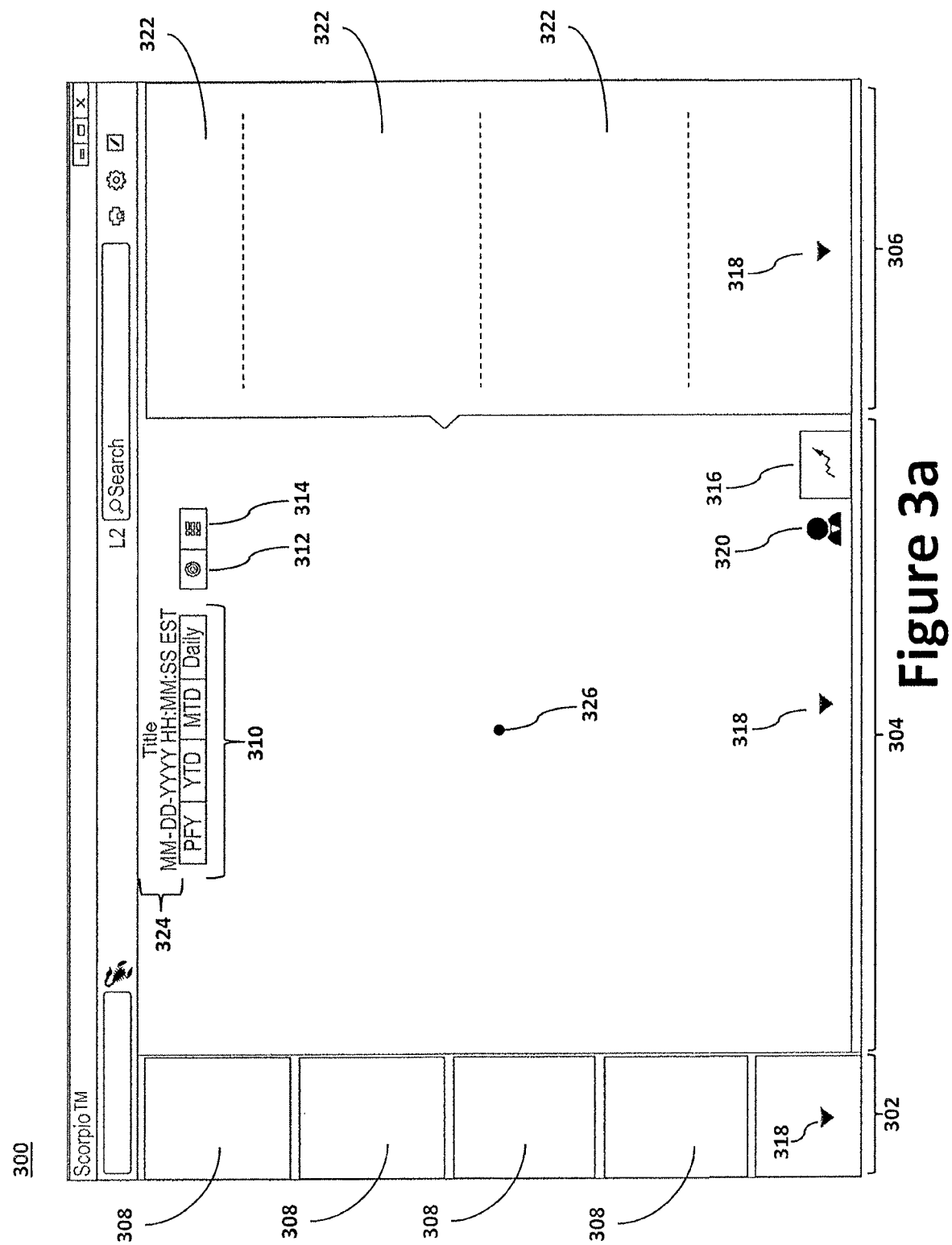
FIG. 3a illustrates an example dashboard page of a data visualization and data management system.

FIG. 3a illustrates an example unpopulated dashboard page 300 of a data visualization and data management system. As illustrated, the central area of the dashboard page 300 may be divided into a plurality of visualization areas, such as a left visualization area 302, a middle visualization area 304, and a right visualization area 306. In order to accommodate a larger amount of data, one or more of said plurality of visualization areas may be vertically scrollable. To facilitate scrolling, each scrollable visualization area may be provided with a scroll icon 318. The scroll icon 318 may be configured to display only when the content of a visualization area expands beyond the viewable region of that visualization area. That is, when a small amount of content is displayed (such that scrolling is not needed), the scroll icon 318 may disappear, be greyed out, deactivated, or a combination thereof. A scroll icon, such as scroll icon 318, may be used, as needed, across virtually every page of the data visualization and data management system to enhance usability. Each of the visualization areas may be used to display a variety of information. For example, as illustrated, the left visualization area 302 may comprise a plurality of information tiles 308, which operate substantially in the same matter as the information tiles of the landing page 200.

The middle visualization area 304, being illustrated as the largest area, may provide the primary content for the dashboard page 300. Notably, the middle visualization area 304 comprises a center region 326 for rendering a data visualization element for a particular dataset, which may be user selectable and may be represented in the form of a multi-dimensional donut 400 or data table 500. For example, the user may select the type of interactive data visualization element by toggling between the chart icon 312 and table icon 314. For example, selecting the chart icon 312 will cause a multi-dimensional donut 400 to be rendered at center region 326, while selecting the table icon 314 will cause a data table 500 to be rendered at center region 326. The dashboard page 300 may be configured such that a default type of interactive data visualization element is illustrated upon loading the dashboard page 300. To that end, the user may designate a particular type of interactive data visualization element by, for example, accessing the system settings via settings icon 218.

The middle visualization area 304 may provide a description header 324 above the center region 326, which provides, for example, a title and the date/time (e.g., current date/time, or dataset updated date/time) associated with the interactive data visualization element. Also provided is a plurality of dynamic filter buttons 310, which may include time period-based filtering, such as Previous Fiscal Year ("PFY"), Year to Date ("YTD"), Month to Date ("MTD"), and/or daily. For example, selecting YTD would cause the various elements to recalculate and only reflect data from the dataset for the YTD time period. While time period-based filtering is illustrated in the example, other filters are possible, including, for example, region, product, or any other descriptive aspect of the data within a given database. The user may further customize the type, order, and arrangement of dynamic filter buttons 310 by, for example, accessing the settings via system settings icon 218. The middle visualization area 304 may provide additional user-selectable icons below the center region 326. For example, the user may select chart icon 316 to view a detail description page associated with displayed dataset, such as historic data, trends, etc., or the directory icon 320 to view, for example, a contact directory page 600. Further, a link to a contact business card may be displayed on the display wherever a name (e.g., a contact name) is displayed, thereby enabling the user to gain access to additional information. Example contacts would include, for example, customers, employees, and any other contact relevant to the entity.

The right visualization area 306 may provide additional details for the dataset being displayed by the interactive data visualization element. For example, the right visualization area 306 may provide a plurality of detailed data regions 322, each of which may comprise detailed data tables and/or detailed charts.

As mobile devices often employ smaller screens, it can sometimes be difficult to view large amounts of data. Thus, data visualization and data management system may be configured to be adapted for a specific screen (e.g., via mobile device) by resizing the window to fit a predetermined screen resolution (e.g., size and/or dimension). However, simply scaling the image can result in smaller, harder, if not impossible, to read text. Accordingly, the dashboard page 300, or other pages disclosed herein, may be configured such that one or more regions may be compressed or hidden.

Figure 3B:
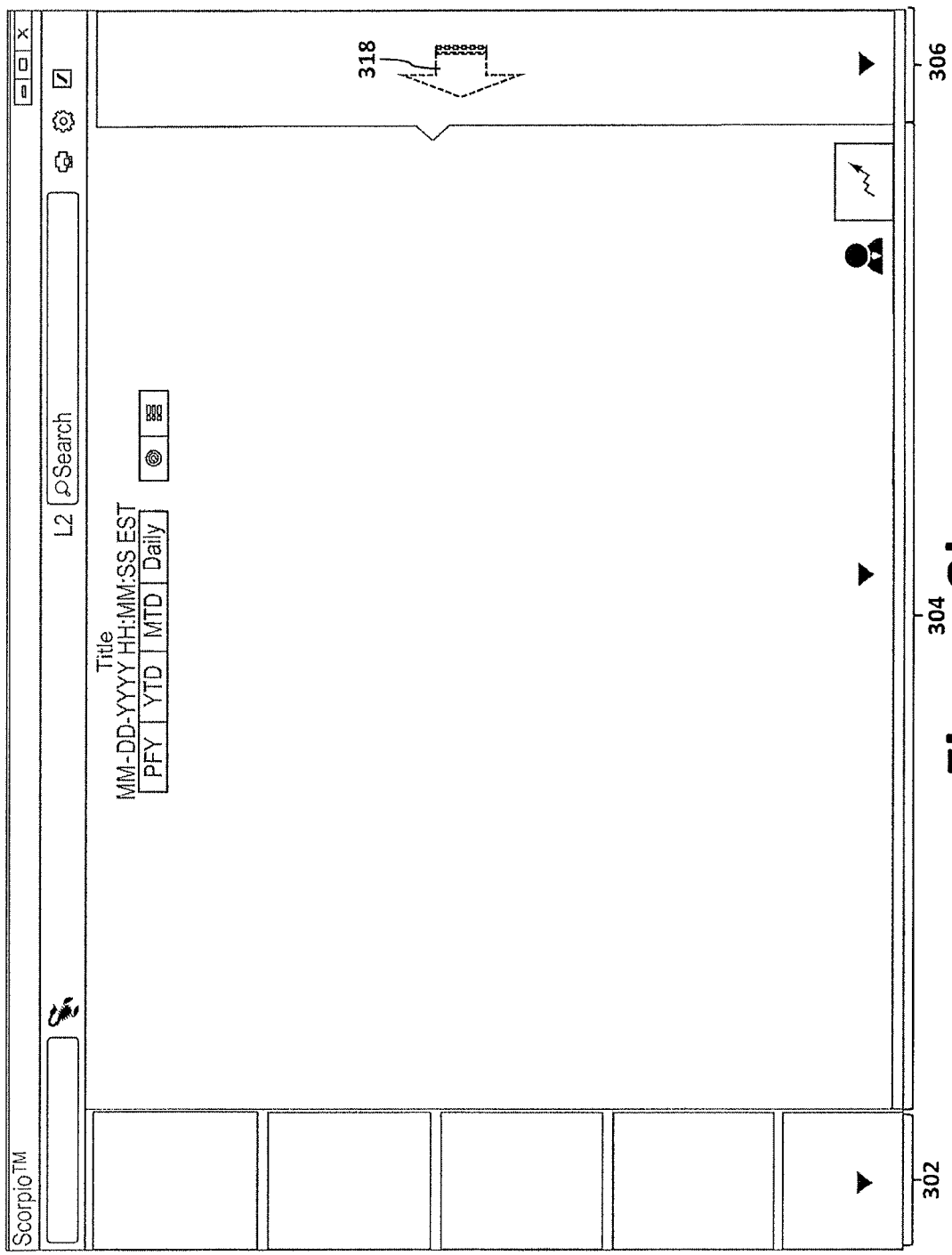
FIGS. 3b and 3c illustrate an example dashboard page configured to resize to fit a predetermined screen resolution.
Figure 3C:
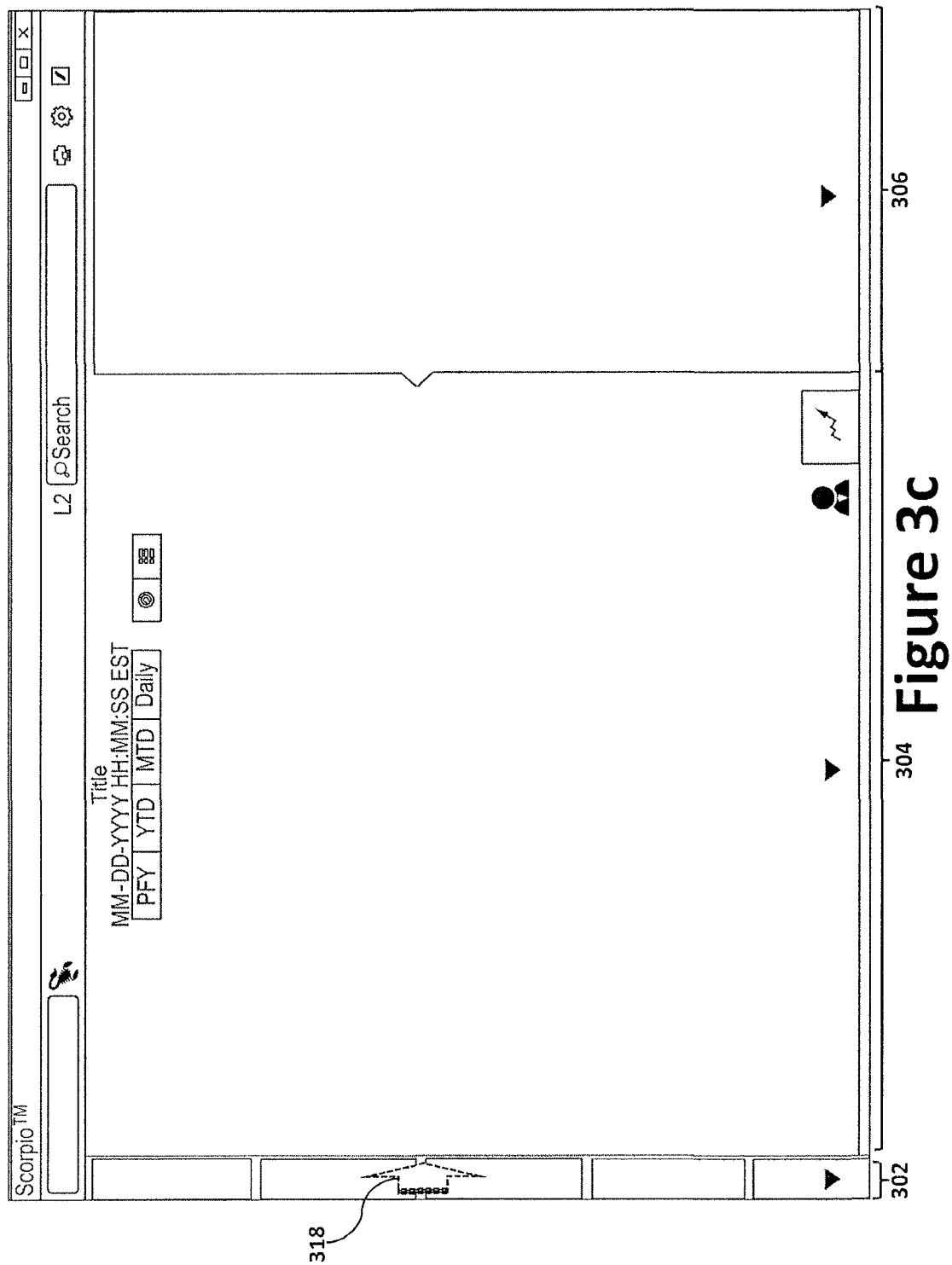

With reference to FIG. 3*b*, the right visualization area 306 may be hidden (e.g., compressed to the right) such that more space is allocated to the left visualization area 302 and the middle visualization area 304. The visualization area may be compressed by selecting a visualization area at an edge (e.g., the left border of the right visualization area 306), and dragging it to the right (e.g., off screen). Similarly, with a touch screen, the same effect may be achieved by simply swiping one's finger from left to right across the edge of the right visualization area 306, until the visualization area is compressed. Once compressed, an expand icon 318 may be provided to enable the user to expand the right visualization area 306 back to its original size and shape. This may be done by selecting the expand icon 318 or, in the alternative, swiping from right to left across the border with one's finger. With reference to FIG. 3*c*, the left visualization area 302 may be hidden in the same manner as described with regard to the right visualization area 306, but, due to the placement (left versus right); the swiping directions may be reversed.

Multi-Dimensional Donut 400.

Figure 4A:
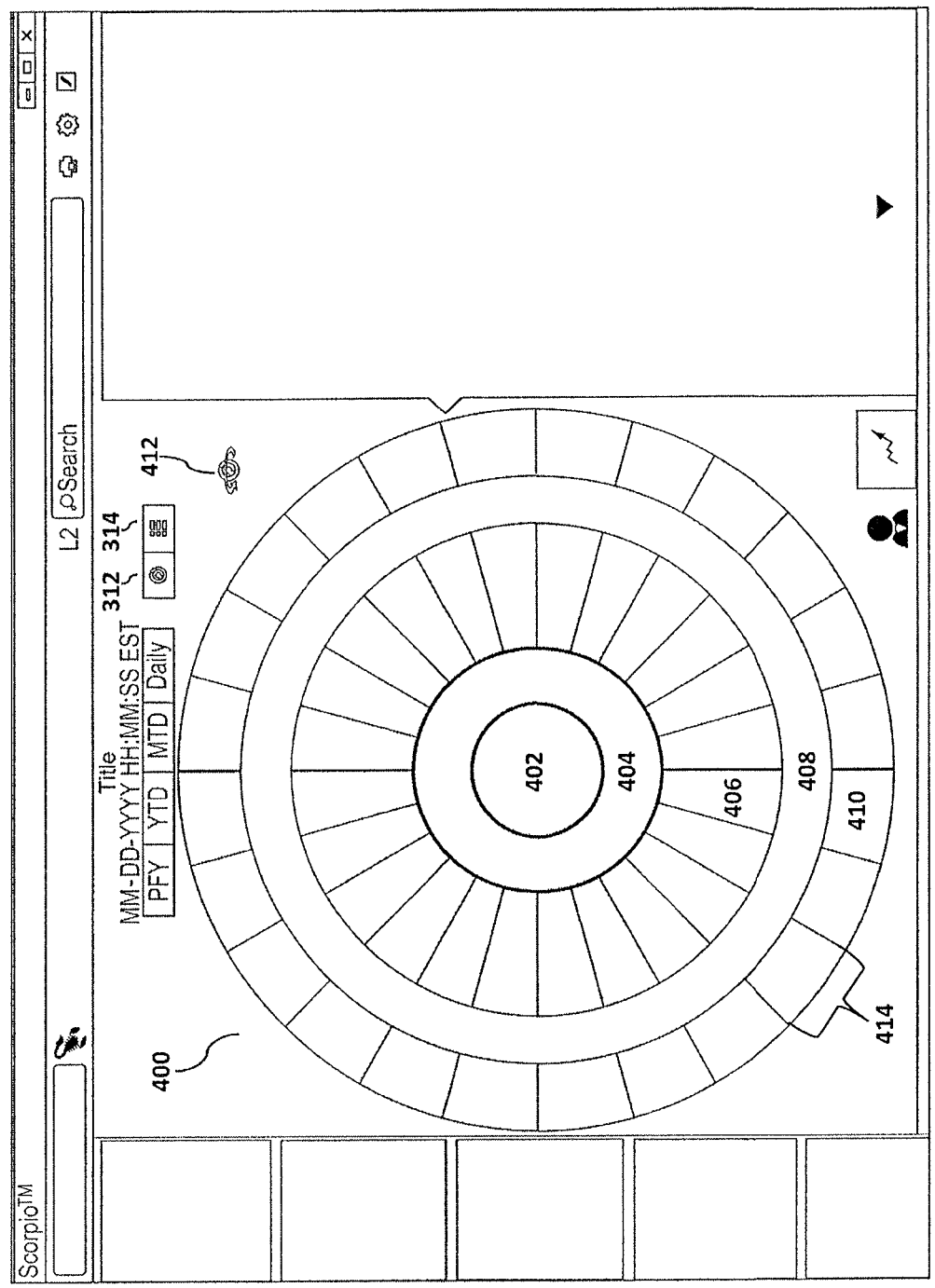
FIG. 4a illustrates an example dashboard page having a data visualization element represented in the form of an unpopulated multi-dimensional donut chart.

FIG. 4*a* illustrates an example dashboard page 300 having a data visualization element represented in the form of an unpopulated multi-dimensional donut 400. As illustrated, the multi-dimensional donut 400 may be divided into a plurality of sectors 414 (akin to a slice) and may comprise a center portion 402 and a plurality of concentric rings of varying diameter (or thickness) axially disposed around the center portion 402. As illustrated, the sectors 414 may extend from the center of the 400 to the outer radius (e.g., traversing the plurality of concentric rings). Each sector 414 may be user selectable and may represent a portion of the dataset (e.g., a particular category). The plurality of sectors 414 may be grouped into one or more clusters, each cluster 416 representing a dimensional category, whereby the multi-dimensional donut 400 may be segmented so as to illustrate and distinguish the one or more clusters 416 (dimensional categories). For example, the one or more dimensional categories may be distinguished by inserting a thicker divider line at the border between adjacent dimensional categories and providing a label at the given cluster's portion of the first concentric ring 404.

Specifically, the multi-dimensional donut 400 may comprise a first concentric ring 404 adjacent the center portion, a second concentric ring 406, a third concentric ring 408, and a fourth concentric ring 410. Each ring may be used to display a different type of data visualization, description (e.g., a label), or numerical value. For example, the center portion 402 may numerically illustrate a total value amount for the entire dataset being displayed, or represented, by the multi-dimensional donut 400 at a given time. The first concentric ring 404 may illustrate labels corresponding to the one or more clusters 416 (dimensional categories) represented within a dataset. The second concentric ring 406 may provide a data visualization component, such as graphically illustrating the portion of the dataset attributed to a specific sector 414. For example, the portion of the second concentric ring 406 in a given sector 414 may be filled like a bar graph. The third concentric ring 408 may numerically illustrate the portion of the dataset attributed to a specific sector 414. In other words, the third concentric ring 408 may provide a numeric value corresponding to the graphical illustration of the second concentric ring 406. Finally, the fourth concentric ring 410 may illustrate the name (e.g., a label) of the sub-category for a specific sector 414. The same data of the multi-dimensional donut 400, but in greater details and with additional drill-down levels, may be provided via the right visualization area 306 in, for example, table form.

An advantage of the interactive multi-dimensional donut 400 is that it enables the user to select two or more dimensions to view the overlap between the selected two or more dimensions. For example, the user may select a first sector 414 from one of a plurality of clusters to view specifics about that sector 414. Thus, upon selecting the first sector, all data values and graphical visualizations within the multi-dimensional donut 400 may be dynamically updated to reflect data for only the selected first sector 414. That is, the first data visualization element and the second data visualization element may be dynamically re-rendered based at least in part of a portion of the dataset represented by the selected first user-selectable region (e.g., sector). In certain aspects, the multi-dimensional donut 400 may be re-rendered such that the selected sector is positioned adjacent the right visualization area 306. For example, the multi-dimensional donut 400 may be re-rendered as having been rotated such that the selected sector is positioned at the 3 o'clock position.

If the user selects a second sector 414 from a cluster 416 (another different dimension), all data values and graphical visualizations within the multi-dimensional donut 400 may again be dynamically updated to reflect data for the selected first and second sectors 414. This may continue until the user has selected a sector 414 from each desired cluster 416. In certain instances, due to space constraints, only a finite number of clusters 416 may be displayed in the multi-dimensional donut 400 at a given time. Thus, a flip icon 412 may be provided to display a different side of the multi-dimensional donut 400, or, in other words, a different visualization of the same dataset illustrated by the first side of multi-dimensional donut 400, but with a different set of cluster 416 being represented. Selected sectors 414 may be differently colored, shaped, or shaded, so as to distinguish them from those sectors 414 that were not selected. Alternatively, the unselected sectors 414 may be removed. To deselect a sector 414 that has been previously selected, the user may tap or click the selected sector, thereby deselecting it. Alternatively, the center portion 402 of the multi-dimensional donut 400 may be selected to deselect the selected sectors one by one, in, for example, reverse order (e.g., last in, first out). Similarly, a clear icon may be provided so as to clear all selected sectors. Regardless of deselecting method, the multi-dimensional donut 400 may then by re-rendered to reflect de-selection of a given sector.

That is, selecting said flip icon 412 causes said processor to re-render the first data visualization element with a second plurality of clusters, in lieu of the first plurality of clusters. Accordingly, the user may selected a first user-selectable region from a cluster chosen from said first plurality of clusters (one side), and a second user-selectable region from a cluster chosen from said second plurality of clusters (another side). Once the user has selected all desired clusters, the first data visualization element and the second data visualization element may be dynamically re-rendered based at least in part on a portion of the dataset represented by the overlap between selected first user-selectable region and the selected second user-selectable region, even though they may reside on different "sides" of the multi-dimensional donut 400.

Example 2

Figure 4B:
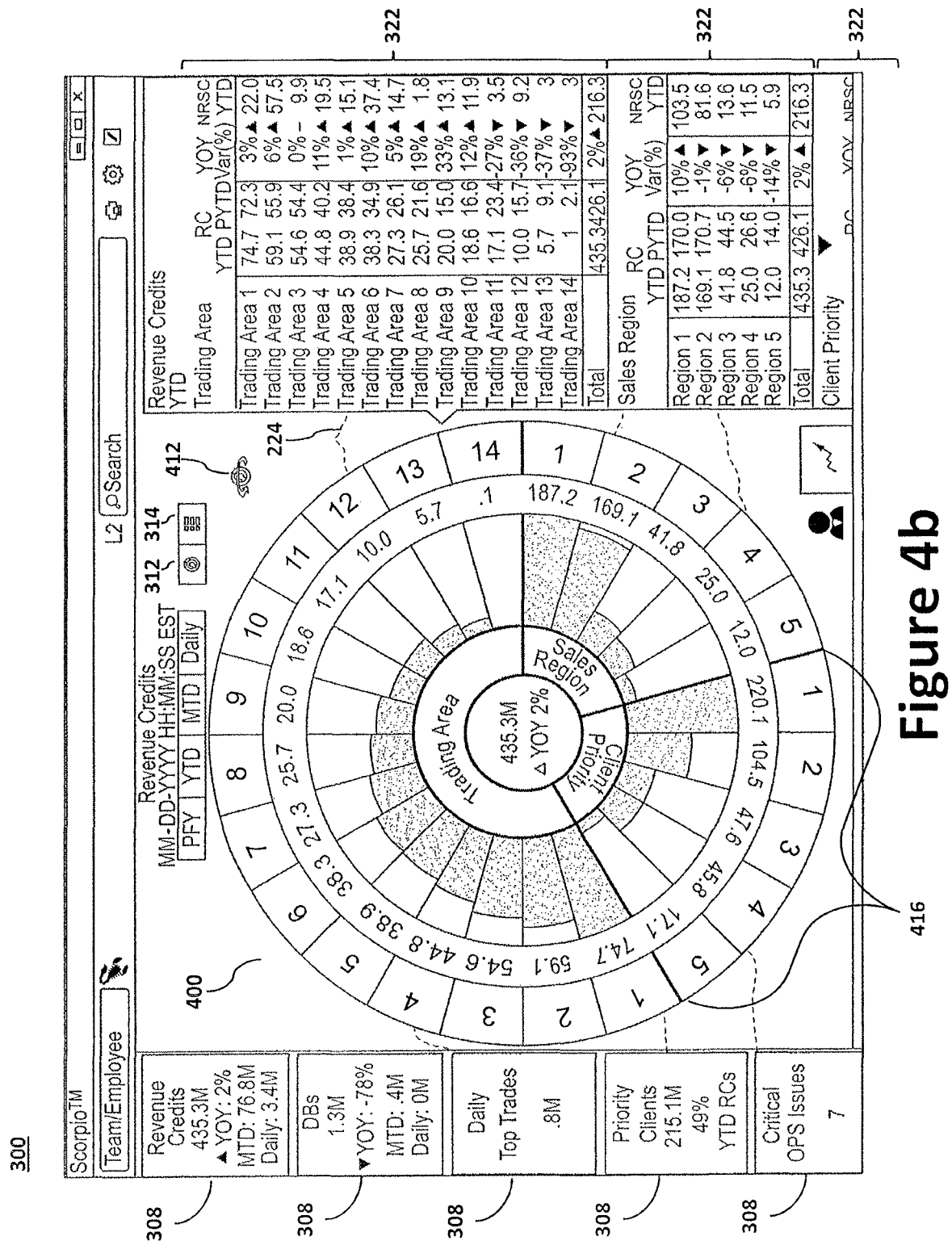
FIG. 4b illustrates an example dashboard page displaying the first side of a data visualization element represented in the form of a populated multi-dimensional donut chart.
Figure 4C:
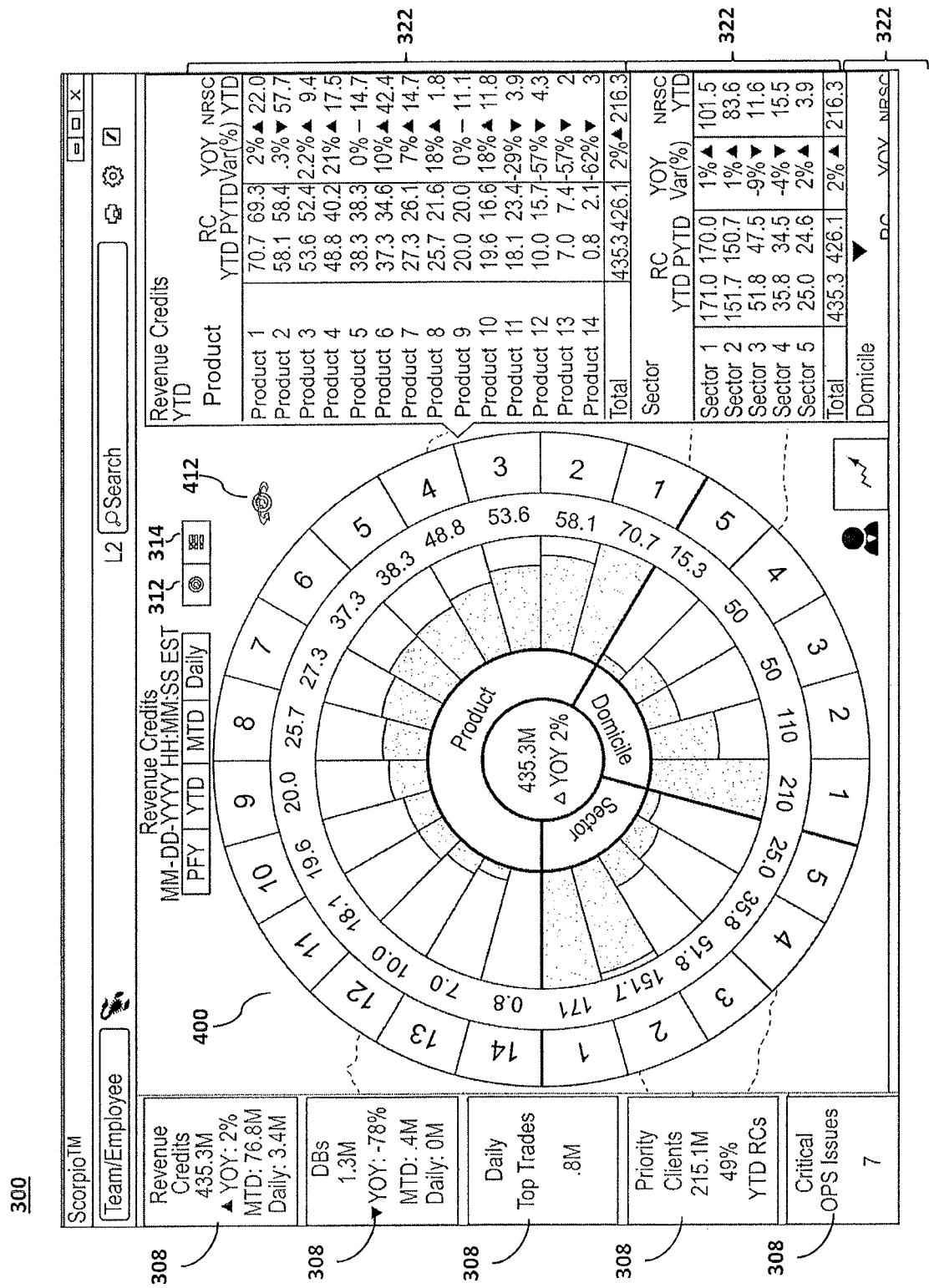
FIG. 4c illustrates an example dashboard page of FIG. 4b displaying the second side of the populated multi-dimensional donut chart.

To provide an overview, the present invention may be illustrated by the Example illustrated in FIGS. 4b and 4c. This Example is provided to aid in the understanding of the invention and is not to be construed as a limitation thereof. In view of the foregoing, FIG. 4b illustrates an example dashboard page 300 displaying the first side of a data visualization element represented in the form of a populated multi-dimensional donut 400. In the following example, the total value of the current view of the revenue credits ("RC") dataset is provided at the center portion 402 as 435.3M (e.g., $435.3 Million, with a Year over Year ("YOY") variance of 2%).

The multi-dimensional donut 400 of FIG. 4b is further illustrated as having three clusters 416 (labeled at the corresponding portion of the first concentric ring 404 as Trading Area, Client Priority and Sales Region). Corresponding data for each dimension 416 vis-à-vis each sub-category is provided at the second and third concentric rings 406, 408 as a bar graph and numerical value, respectively. Finally, the title of each sub-category is provided at the corresponding portion of the fourth concentric rings 410 as simple numerals. The total of each cluster 416 is substantially equal (subject to rounding) to the value of the total value of the current view (see center portion 402). That is, the summation of the values at the third concentric ring 408 for each of the separate three clusters 416 will be equal for each view (e.g., 435.3M; the current view, prior to filtering).

Specifically, the Trading Area dimension is illustrated as having fourteen sub-categories (each sub-category being allocated a sector 414), which are in turn labeled, for simplicity, as 1 through 14 at the fourth concentric ring 410. Correspondingly, the Sales Region dimension is illustrated as having five (5) sub-categories, which are labeled as 1 through 5 at the fourth concentric ring 410. Finally, the Client Priority dimension is illustrated as having five (5) sub-categories, which are labeled as 1 through 5 at the fourth concentric ring 410. However, the name or icon for one or more of the sub-categories may be inserted in lieu of "1, 2, 3, n." The various sub-categories within a given dimension may be sorted (e.g., radially arranged around the center portion 402) (1) alphabetically by description label; (2) ascending, by numeric value; or (3) descending, by numeric value. The various sub-categories within a given dimension may be sorted in either clockwise (as illustrated in FIG. 4b) or counter-clockwise (as illustrated in FIG. 4c) manner.

To the extent that a user is only interested in Trading Area 1, the user can select the sector 414 corresponding to Trading Area 1 (i.e., the sector showing 74.7M). Upon selecting the Trading Area 1 sector 414, all data will be updated to reflect only the data of Trading Area 1. That is, the first data visualization element and the second data visualization element are dynamically re-rendered based at least in part on a portion of the dataset represented by Trading Area 1. Thus, the center portion 402 will be updated to read 74.7M (the new total, as filtered), and all other data and charts will be adjusted and/or re-rendered to reflect the overlap with Trading Area 1, if any. Accordingly, certain sub-categories may be zero (0) if there is no overlap. For example, Trading Areas 2 through 14 will become zero (0) because there wouldn't be overlap between sub-categories of the same cluster 416. In certain aspects, the sub-categories that are zero (0) may be removed from the multi-dimensional donut 400, and re-rendered to only include sectors 414 having non-zero values. For example, building on the prior example, the sectors for Trading Areas 2-14 would be entirely removed, thus leaving only Trading Area 1 and non-zero sub-categories from the Client Priority and Sales Region cluster 416. Removing these sectors 414 will provide additional space along the arc of the multi-dimensional donut 400, thereby providing for additional functionality, such as drilldown within the multi-dimensional donut 400. For example, space permitting, a user may be able to select a sector 414, thereby causing new drill-down sectors to fan out from the selected sub-category sector to display any sub-groups sectors for the selected sub-category sector.

To the extent that a user is only interested in overlap between Trading Area 1 and Sales Region 4, the user can select a second sector (i.e., the sector 414 corresponding to Sales Region 4). Upon selecting the Sales Region 4 sector 414 (recall, the Trading Area 1 sector 414 remains selected from the prior example), all data will be again updated to reflect only the data overlapping between Trading Area 1 and Sales Region 4 in the same manner as described above. Thus, the multi-dimensional donut 400 and the right visualization area 306 (e.g., detailed data regions 322) may be dynamically re-rendered based at least in part on a portion of the dataset represented by the selected first user-selectable region (Trading Area 1) and the selected second user-selectable region (Sales Region 4). In certain aspects, the user may apply further filtering by selecting additional sectors from any remaining clusters 416.

As noted above, the same data of the multi-dimensional donut 400 is provided via the right visualization area 306 in table form, but with greater detail, such as enhanced drill-down levels and additional data types. That is, the right visualization area 306 dynamically updates as the multi-dimensional donut 400 is updated or filtered. For example, each sub-category of each of the three cluster 416's dimensions is illustrated with additional information, including, for example, data types: (1) RC Year to Date ("YTD"); (2) RC Previous Year to Date ("PYTD"); (3) Year over Year ("YOY") variance percentage; and (4) Non-Risk Selling Concession ("NRSC") YTD. The right visualization area 306 may provide one or more levels of drill-down functionality. Thus, the user may select a sub-category (e.g., Trading Area 5) to display a drop down of any sub-groups of the selected sub-category. For example, if Trading Area 5 comprises sub-groups 1 through 20, sub-groups 1 through 20 may be listed with values for each of the relevant data types. The user may then further drill-down (to another level) by selecting a sub-group to view a further categorical break down of the selected sub-group, and so on. As illustrated, the additional information does not fit within the viewable portion of the right visualization area 306, thus the scroll icon 318 is provided to enable the user to scroll and view all data.

As noted above, only a finite number of clusters 416 may be displayed in the multi-dimensional donut 400 at a given time due to space constraints. Thus, the flip icon 412 may be provided to display a different "side" of the multi-dimensional donut 400 to reveal a different set of dimensions. That is, selecting the flip icon may cause the processor to re-render the multi-dimensional donut 400, while retaining the dataset, with a second plurality of clusters 416, in lieu of the first plurality of clusters 416. For example, FIG. 4c illustrates the example dashboard page 300 of FIG. 4b, but displaying a second side of the populated multi-dimensional donut. As with FIG. 4b, the total value of the current view is provided at the center portion 402 as 435.3M, because it involved the same dataset.

The multi-dimensional donut 400 of FIG. 4c is illustrated as having three additional clusters 416 (labeled at the first concentric ring 404 as Product, Domicile and Sector). Corresponding data for each dimension 416 vis-à-vis each sub-category is provided at the second and third concentric rings 406, 408 as a bar graph and numerical value, respectively. Specifically, the Product dimension is illustrated as having fourteen (14) sub-categories (each sub-category being allocated a sector 414), which are in turn labeled as 1 through 14 at the fourth concentric ring 410. Correspondingly, the Sector dimension is illustrated as having five (5) sub-categories, which are labeled 1 through 5 at the fourth concentric ring 410. Finally, the Domicile dimension is illustrated as having five (5) sub-categories, which are labeled as 1 through 5 at the fourth concentric ring 410. However, the multi-dimensional donut 400 of FIG. 4c is, from a functional standpoint, otherwise the same as the multi-dimensional donut 400 of FIG. 4b. Similarly, the right visualization area 306 dynamically updates as the multi-dimensional donut 400 is updated or filtered.

By providing a different side (e.g., a second side), the user may now filter the data using, for example, 6 different dimensions. That is, the user may select a first user-selectable region from a cluster chosen from the first plurality of clusters, at which point the multi-dimensional donut 400 may be dynamically re-rendered to reflect the first user-selectable region (as discussed above). The user may then select the flip icon, thereby causing the processor to re-render the first data visualization element with a second plurality of clusters, in lieu of the first plurality of clusters. During this flip re-rendering process, the multi-dimensional donut 400 may be displayed as flipping, like a coin. Once flipped, the user may then select a second user-selectable region from a cluster chosen from said second plurality of clusters. After which, the first data visualization element and the second data visualization element may again be dynamically re-rendered based at least in part on a portion of the dataset represented by the selected first user-selectable region and the selected second user-selectable region. That is, the overlap is display. For example, to the extent that a user is only interested in overlap between Trading Area 1 and Sector 3, the user can select Trading Area 1 from the first side, select the flip icon 412 (thereby cause the multi-dimensional donut 400 to flip), and then select Sector 3 from the second side. While the multi-dimensional donut 400 is depicted and described as having two sides, one of skill in the art would appreciate that additional sides may be provided in view of the present teaching and therefore, the present teaching should not be limited to a 400 having only two sides.

Data Table 500.

Figure 5A:
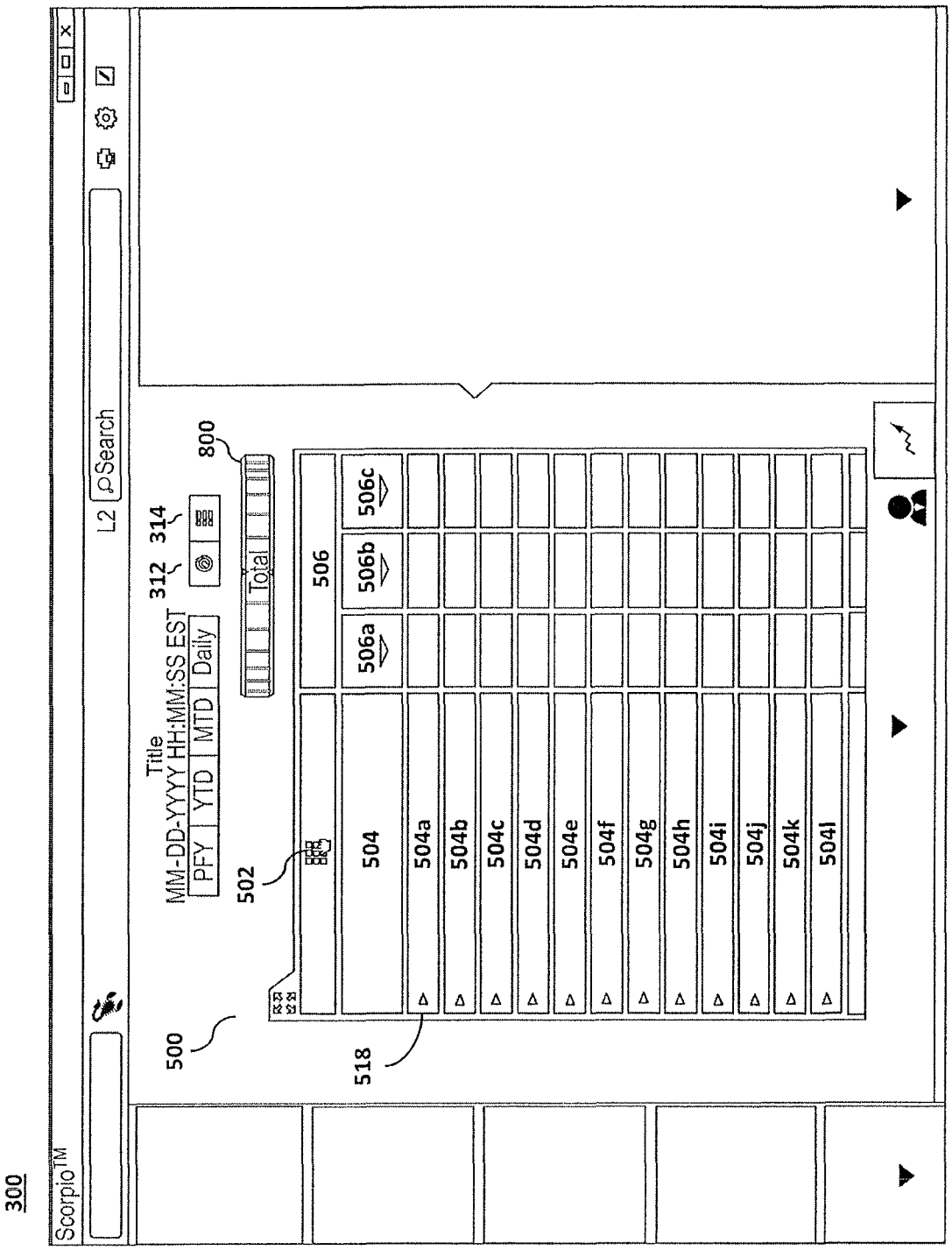
FIG. 5a illustrates an example dashboard page having a data visualization element represented in the form of an unpopulated data table.

FIG. 5a illustrates an example dashboard page 300 having a data visualization element represented in the form of an unpopulated data table. From the multi-dimensional donut 400 dashboard pages 300, the user may select the table icon 314 to render a data table 500 at center region 326 in lieu of the multi-dimensional donut 400. The data table 500 may provide a first column 504 and a second column 506. The first column 504 may represent, for example, a first dimension, while the second column 506 may represent a second dimension.

Accordingly, the first column 504 may comprise a plurality of rows (504a-504l) representing the sub-categories of the first dimension, while the second column 506 may comprise a plurality of sub-columns (506a-506c) representing the sub-categories of the second dimension. As would be appreciated by those skilled in the art, the data value located at a point whereby a row intersects with a sub-column represents the overlap between two sub-categories. To apply a filter (e.g., another dimension sub-category, time-based, location, or other filter), a filter selector element 800 may be provided, for example, above the data table 500 on the dashboard page 300. As will be discussed with regard to FIGS. 8a-8e, the filter selector element 800 may be adjusted (e.g., turned) from left to right to select a desired filter, dimension, or other selectable criteria.

The data table 500 may provide one or more levels of drill-down functionality. For example, the user may select a drop-down icon 518 to display a drop down of any sub-groups of the selected sub-category. That is, the drop-down icon 518 may enable the user expand the data element down to display a hierarchy of the data element. For example, if sub-category 504b comprises sub-groups 1 through 4, sub-groups 1 through 4 may be listed with values for each of the sub-category 506a-506c. The user may further drill down (to another level) by selecting a second drop-down icon (not shown) adjacent a sub-group to view a further categorical break down of the selected sub-group, and so on. As illustrated, the additional information does not fit within the viewable portion of the middle visualization area 304, thus the scroll icon 318 is provided to enable the user to scroll and view all data.

Example 3

Figure 5B:
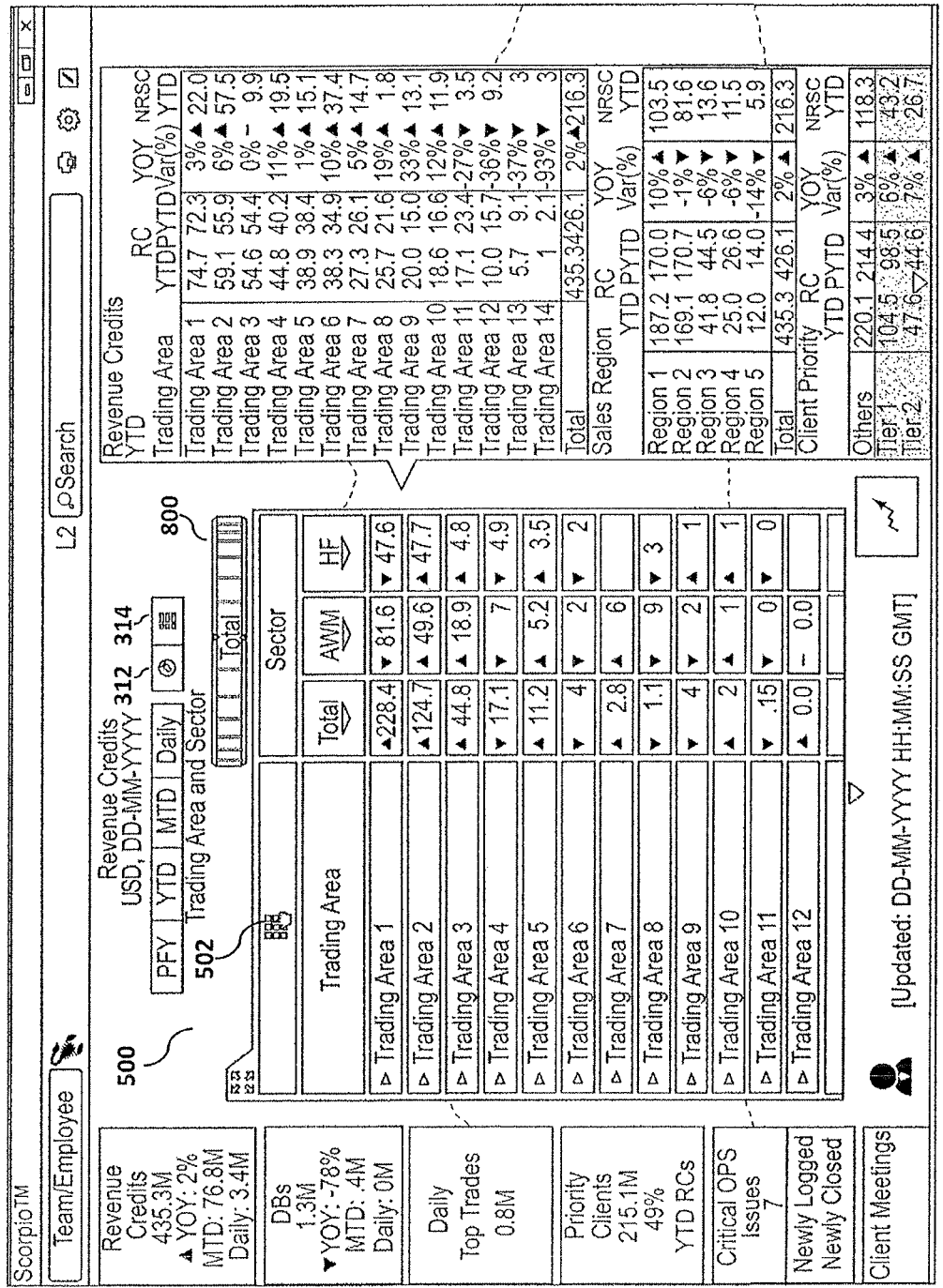
FIG. 5b illustrates an example dashboard page having a data visualization element represented in the form of a populated data table.

To provide an overview, the present invention may be illustrated by the Example illustrated in FIG. 5b. This Example is provided to aid in the understanding of the invention and is not to be construed as a limitation thereof. FIG. 5b illustrates an example dashboard page 300 having a data visualization element represented in the form of a populated data table 500. Specifically, FIG. 5b illustrates a data table 500 with two dimensions, Trading Area and Sector. To select the dimensions for a given chart view (e.g., those being used at the X and Y axis of the data table 500); the user may access a dimension selector table window 510 by selecting the dimension selector icon 502.

Selector Table Window 510.

Figure 5C:
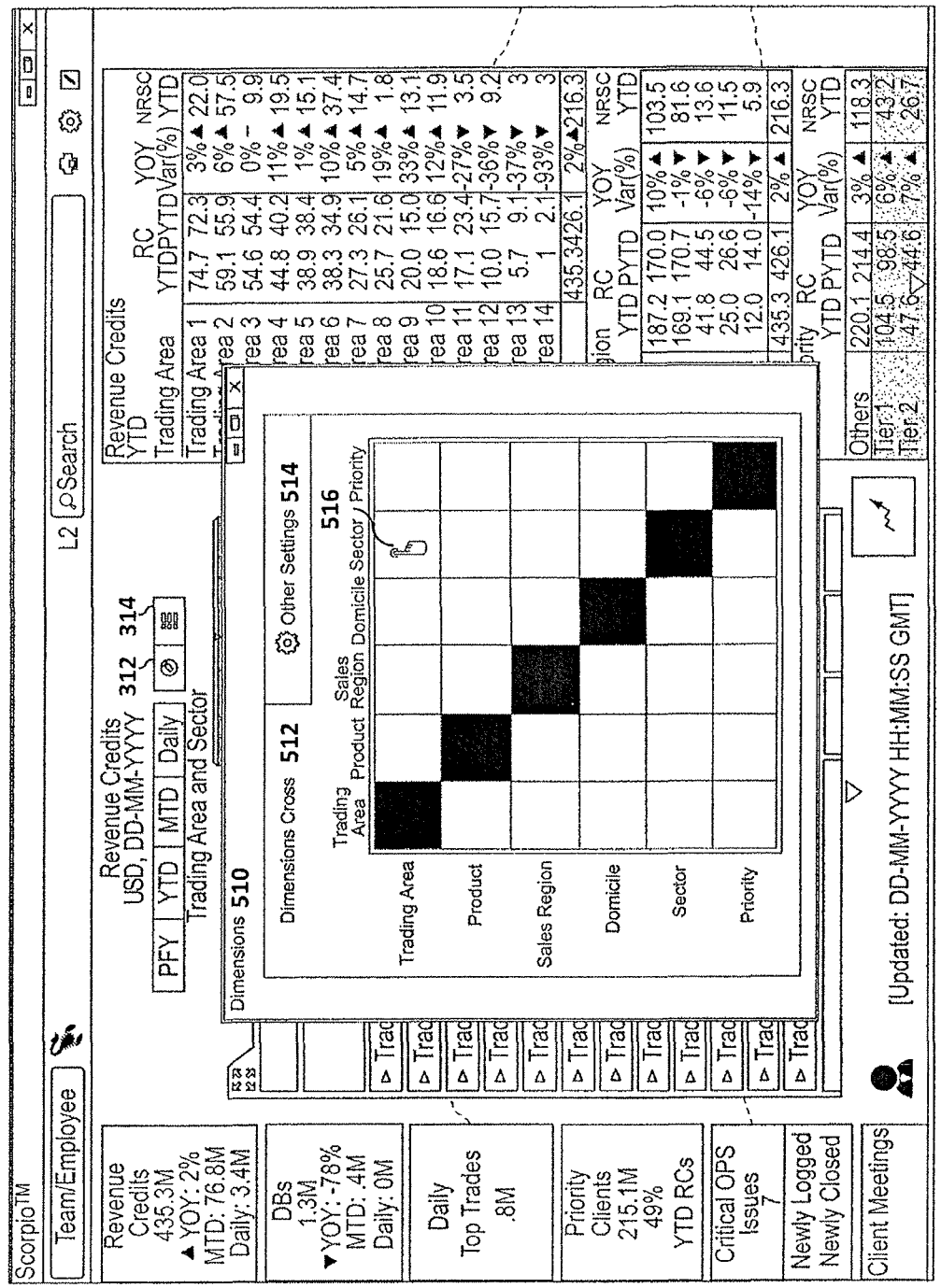
FIG. 5c illustrates the example dashboard page of FIG. 5b having an overlaid dimension selector table window.

FIG. 5c illustrates an example selector table window 510 overlaying the dashboard page 300 of FIG. 5b. The selector table window 510 may comprise two tabs, one for a dimension cross selector element 512 and another for other settings 512. As illustrated, six dimensions (i.e., Trading Area, Client Priority, Sales Region, Product, Domicile and Sector) are listed along the X and Y axis of the dimension cross selector 512. To select a dimension combination (i.e., two dimensions), the user may simply select the point whereby a desired dimension row intersects a desired dimension column. For example, intersection 516 of dimension cross selector element 512 represented selecting the Sector and Trading Area dimensions. The black boxes represent intersections whereby a dimension intersects itself, thus the black boxes are preferably not selectable.

Contact Directory 600.

Figure 6A:
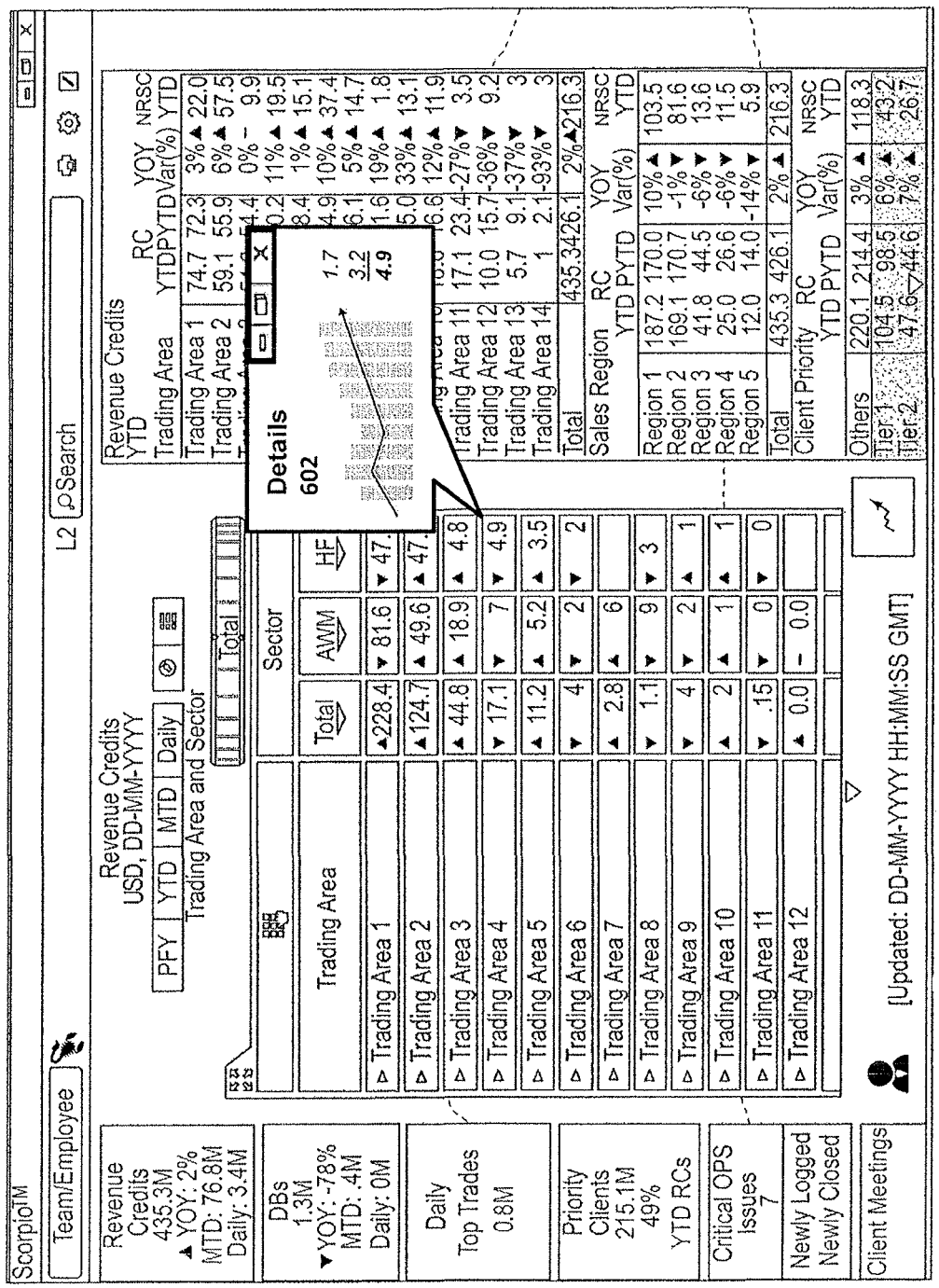
FIG. 6a illustrates the example dashboard page of FIG. 5b having an overlaid detailed view window.
Figure 6B:
FIG. 6b illustrates the example dashboard page of FIG. 5b having an overlaid contact directory window.

FIG. 6b illustrates the dashboard page 300 of FIG. 5b having an overlaid contact directory 600 window. The contact directory 600 may comprise two tabs, one for a specific (e.g., selected) contact data card 606 and another for a directory 604, which is preferably searchable (e.g., via one or more keywords or demographics). The contact card 606 may include information about the contact, or other individual in a network, such as a photo, name, title, company name, address, phone number, email, contact statistics, review(s) (e.g., those by supervisors, clients, etc.), background, (e.g., educational background, resume, etc.) and personal performance data. The contact data card 606 may further comprise a telephone icon and email icon, whereby selecting the telephone icon will cause the computing device 106 to dial a phone number associated with the contact and selecting the email icon will cause the computing device 106 to email an email address associated with the contact. The contact directory 600 may be further integrated with, or provide a link to, a contact relationship management system.

Detailed Zoom Window 602.

FIG. 6a illustrates the dashboard page 300 of FIG. 5b having an overlaid detailed view window 602. In certain situations, it may be difficult to see the data in a given chart. Further, it may be advantageous to view details beyond those that are providing in a specific region of a table, chart, etc. Thus, it can be advantageous to provide a detailed view window 602 that provide additional drill-down information for a given data value. The detailed view window 602 may further provide source data (e.g., underlying data and calculations) and/or one or more graphical illustration. The detailed view window 602 may be called upon by selecting or hovering over a specific data point. Further, upon selecting the chart icon 316, a detailed description page may be displayed. The detailed description page, which may comprise, for example, a trend chart, may slide up from the bottom and occupy a portion of the screen (e.g., half of the display). The detailed description page may be based on selected values in the underlying multi-dimensional donut 400 or data table 500.

Data Periodic Table 700.

Figure 7A:
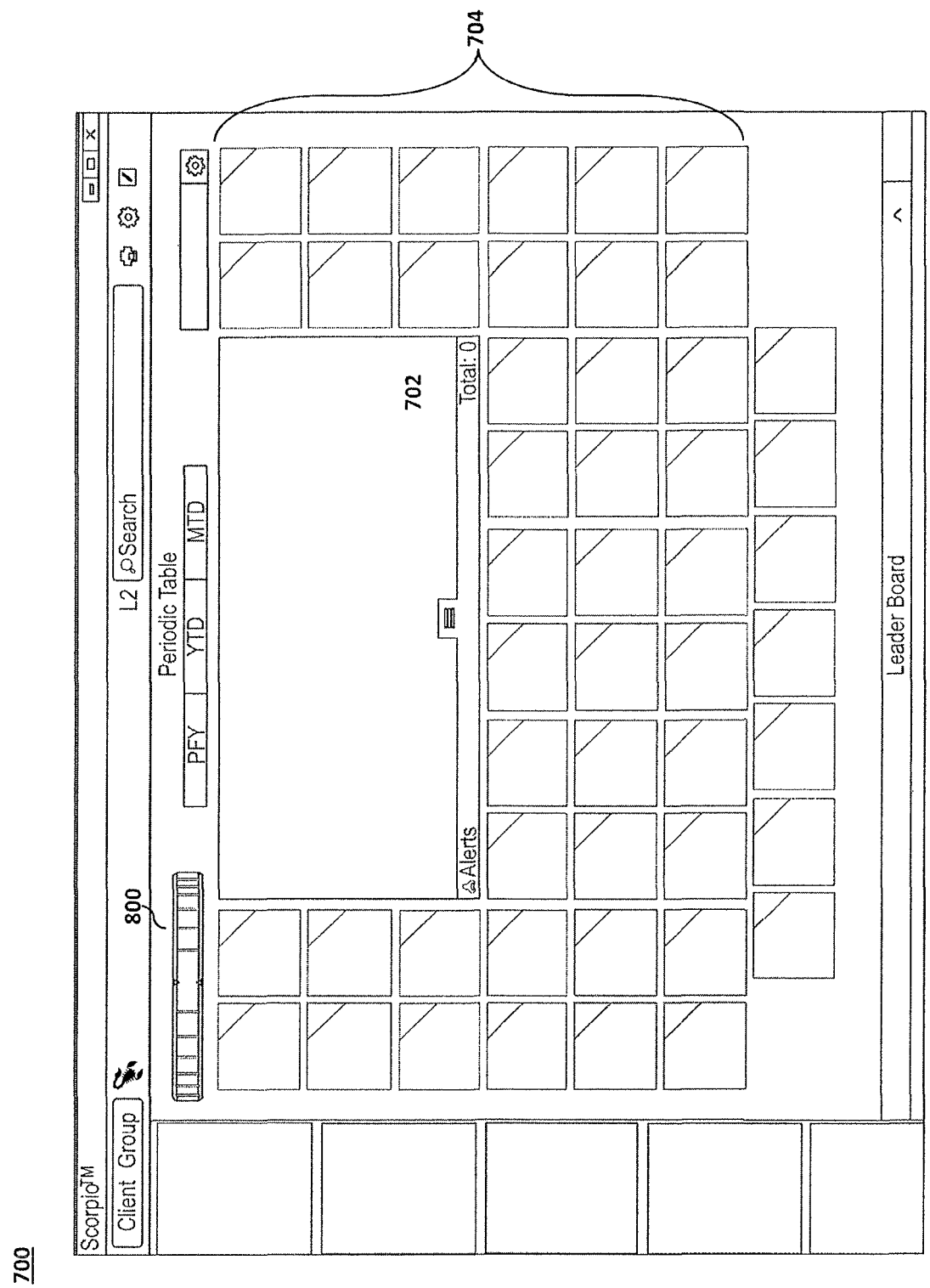
FIG. 7a illustrates an example data visualization element represented in the form of an unpopulated data periodic table.

FIG. 7a illustrates an example data visualization element represented in the form of an unpopulated data periodic table 700. The data periodic table 700 may comprise a detailed view window 702 and a plurality of tile portion 704 arranged around said detailed view window 702. Each tile portion 704 may represent, for example, a specific entity, person, stock, client, or the like, while the detailed view window 702 may provide additional information associated with a selected tile portion 704. That is, a user may select one of said plurality of tile portions 704 to view additional details for that tile portion 704. A filter selector element 800 may be provided to display only those tile portions 704 having particular characteristics or meeting filter criteria. For example, if the user wishes to view the tile portions 704 for clients in the top 10% of the group, the user may adjust the filter selector element 800 to the filter criteria "Top 10%" and all tile portions 704 not meeting the selected filter criteria will be greyed out, so as to distinguish them from those meeting the selected filter criteria. Alternatively, the tile portions 704 not meeting the selected filter criteria may be changed in color or removed.

Figure 7B:
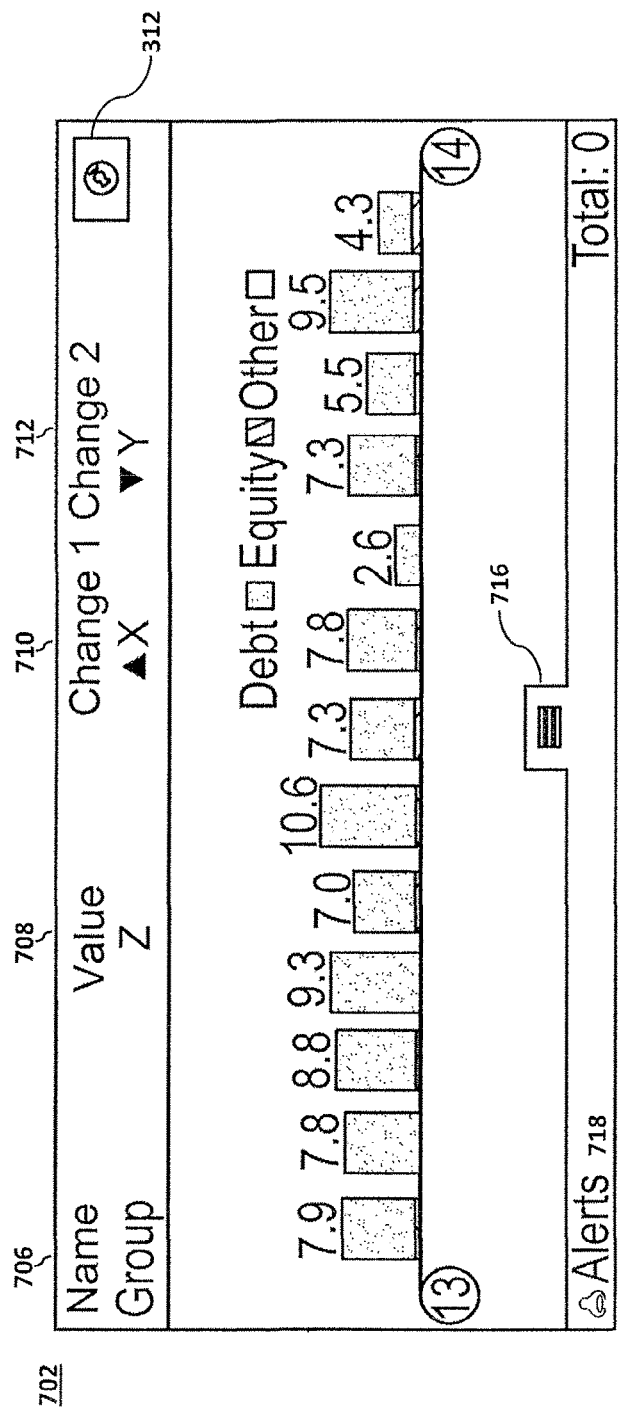
Figure 7C:
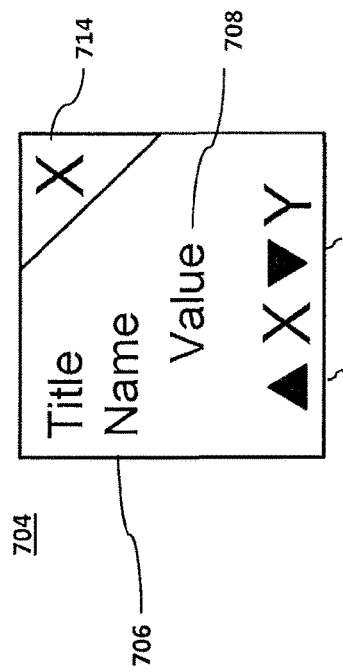

FIG. 7b illustrates an example detailed view window 702 of the data periodic table of FIG. 7a, while FIG. 7c illustrates an example detailed view of the tile portion. As illustrated, each tile portion 704 may provide a plurality of data elements, such as, for example, a title, name 706, value 708, an alert icon 714, and one or more trend indicators, such as a first trend indicator 710, and second trend indicator 712. The alert icon 714 may be an icon, such as a bell, or a number, wherein the number corresponds to the number of alerts for said tile portion 704. An alert, for example, may be a press release, news story, sudden change in status of value, etc. Certain of said plurality of data elements, such as more important data element, may be illustrated as being larger than other data elements so as to emphasize them. For example, value 708 may occupy the largest area of tile portion 704. The detailed view window 702 may similarly provide name 706, value 708, first trend indicator 710, and second trend indicator 712, but may further provide one or more data visualizations, a chart icon 312 (and/or table icon 314), or a pull tab 716, which may illustrate and display the alerts 718 identified by the alert icon 714. For example, selecting the chart icon 312 will cause a multi-dimensional donut 400 to be displayed representing the data of said tile portion 704. In certain aspects, an alarm may be set such that the computing device sounds an alarm (e.g., vibrates or rings) so as to alert the user as to an alert for a particular tile portion 704.

Figure 7D:
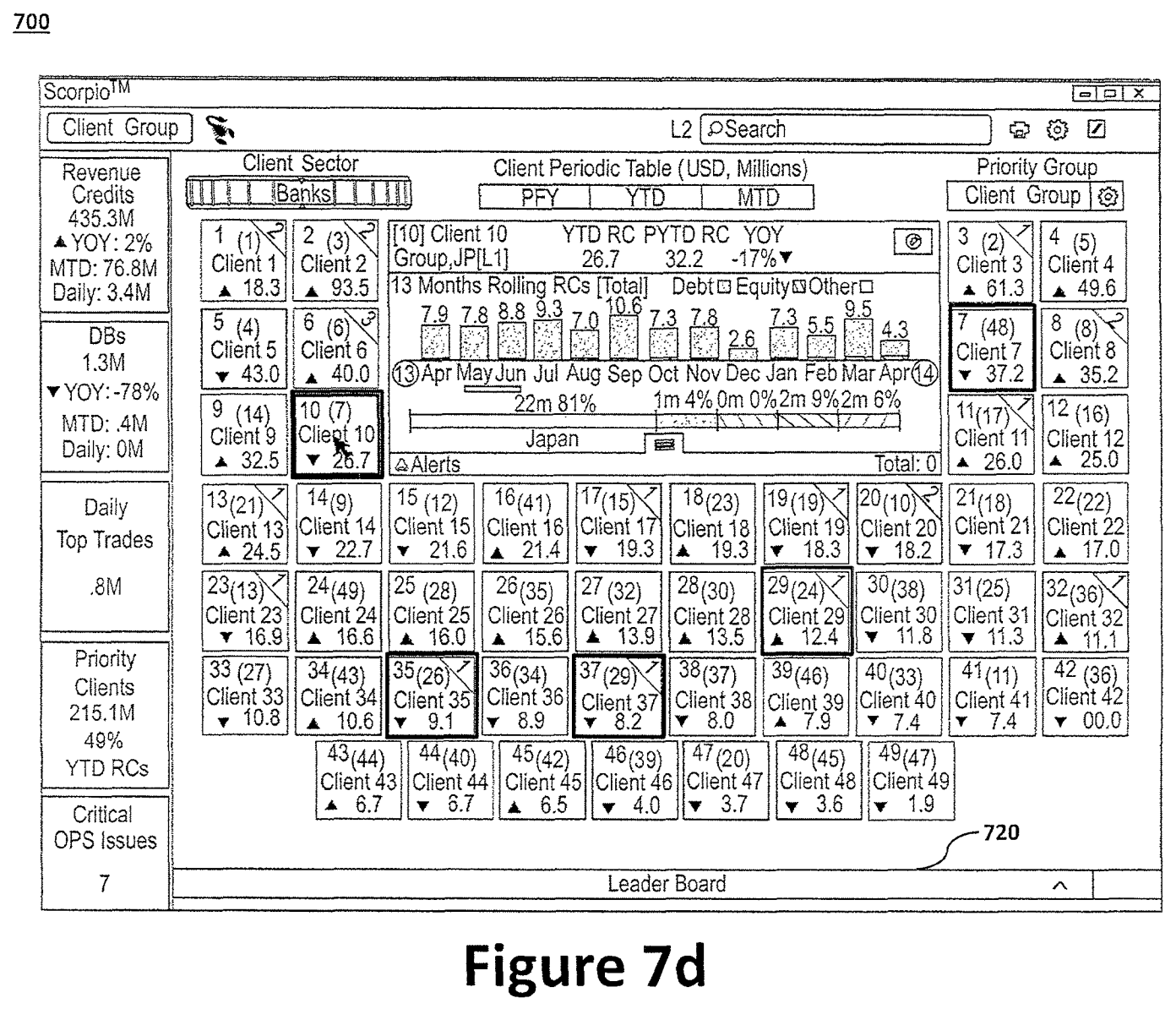

FIG. 7d illustrates an example data visualization element represented in the form of a populated data periodic table 700. Specifically FIG. 7d illustrates wherein Client 10 has been selected. Accordingly, additional information for Client 10 (i.e., the selected tile portion 704) is displayed in the detailed view window 702. Note, the selected tile portion 704 does not provide an alert icon 714 (because there are currently no alerts for Client 10), thus, the pull tab 716 region of the detailed view window 702 similarly indicates a total of 0 alerts. However, if Client 2 had been selected, the pull tab 716 region of the detailed view window 702 would similarly indicate a total of 2 alerts, while enabling the user to display details associated with each alert via the pull tab 716. For instance, pull tab 714 may cause a page to extend upward from the tab region, and provide detailed information, such as text, image, and/or hyperlinks to another location (whether local or on the Internet).

Further note, the filter selector element 800 of FIG. 7*d* filters the various clients (each of which are represented as a tile portion 704) by Client Sector, and is currently set to display or highlight only clients that are banks. Thus, all tile portions 704 displayed with a thicker border are banks (i.e., Clients 7, 10, 24, 26, and 29). However, as discussed above, other means may be employed to highlight the filtered clients. In certain aspect, the data periodic table 700 may provide a Leader Board pull-up window 720 (e.g., like a drop-down window, but extending upwardly). The Leader Board pull-up window 720 may be used to display those clients who have achieved a particular threshold (e.g., milestone or ranking), as set by the system or user. For example, the Leader Board pull-up window 720 may display a detailed list of clients having generated more than X in revenue, regardless of the client sector.

Data Filter Selector Element 800.

Figure 8A:
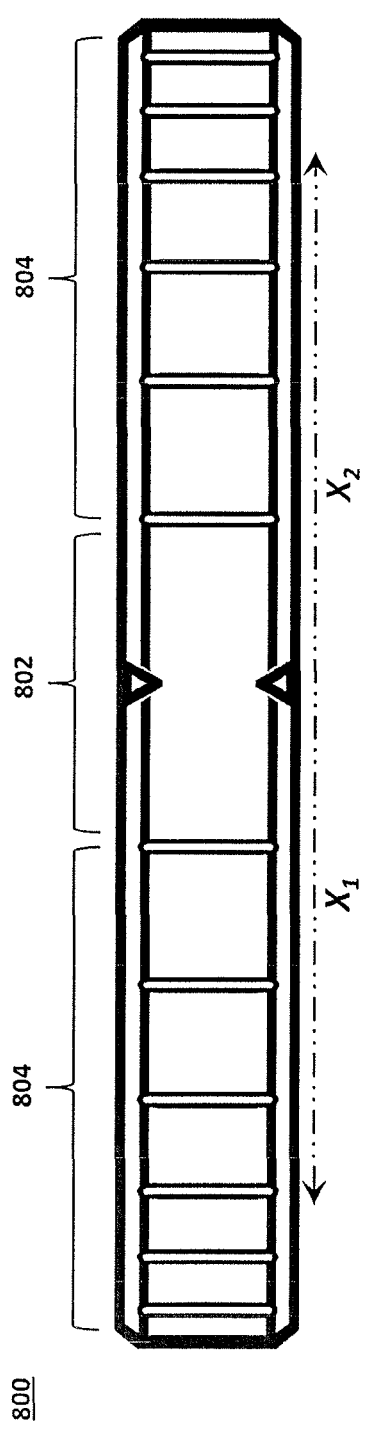
FIG. 8a illustrate an example data filter selector element.
Figure 8B:
FIGS. 8b through 8e illustrate the example data filter selector element of FIG. 8a switching between various filter positions.
Figure 8C:
Figure 8D:
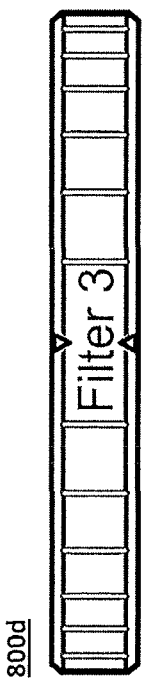
Figure 8E:
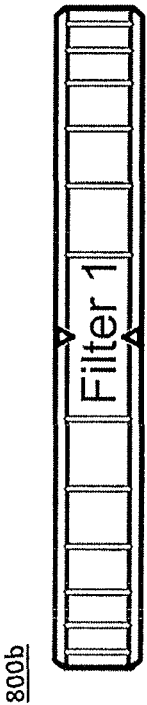

FIG. 8*a* illustrates an example data filter selector element 800. The data filter selector element 800 may generally comprise two general section types, a selected filter section 802 and adjacent unselected filter sections 804. The user may switch between the filters by toggling the selector in to the left (Direction $X_1$) or right (Direction $X_2$). Alternatively, the data filter selector element 800 may be rotated 90 degrees such that the user may switch between the filters by toggling the selector up/down (or variation thereof). Each of said selected filter section 802 and said adjacent unselected filter sections 804 have, displayed thereon, a description of the filter type being selected. FIGS. 8*b* through 8*d* illustrate the example data filter selector element of FIG. 8*a* switching between positions; for example, from Total, to Filter 1, to Filter 2, to Filter 3, etc. Once the data filter selector element 800 has cycled through all filters, the data filter selector element 800 may return to the first filter (or total), or, indicate to the user that the data filter selector element 800 has reached the end.

Figure 9A:
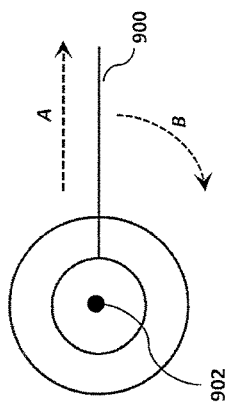
FIGS. 9a through 9j illustrate the example method of generating and displaying a data visualization element in the form of a multi-dimensional donut chart.

FIGS. 9*a* through 9*j* illustrate the example method of rendering (or re-rendering after a change) the multi-dimensional donut 400. That is, the multi-dimensional donut 400 may be rendered such that the plurality of concentric rings, and various sectors embodied therein, are gradually rendered and populated (e.g., one or more of said plurality of concentric rings are rendered one sector, or portion thereof, at a time). For example, as illustrated in FIG. 9*a*, the center portion 402 and first concentric ring 404 may be initially rendered without the remaining concentric rings. Alternatively, in certain aspects, it may be preferable to only display the center portion 402 upon initially rendering.

Figure 9B:
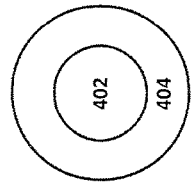
Figure 9C:
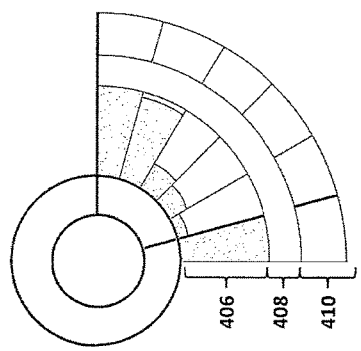
Figure 9D:
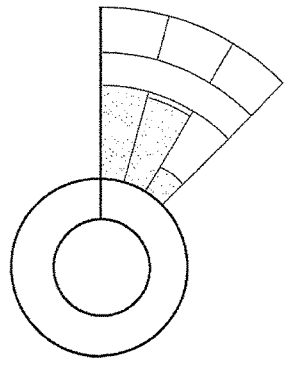
Figure 9E:
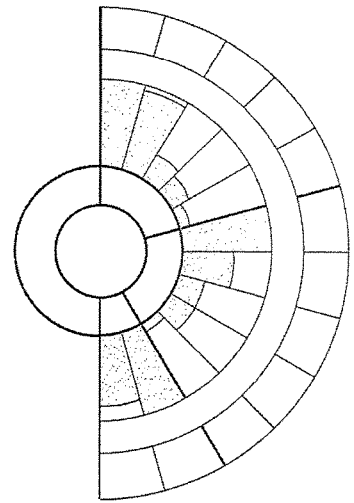
Figure 9F:
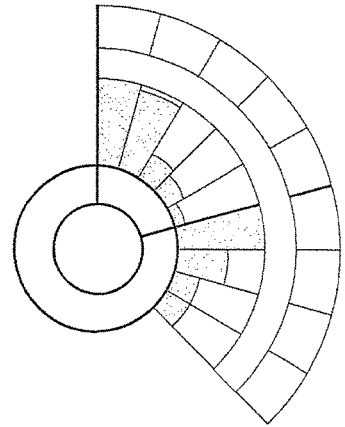
Figure 9H:
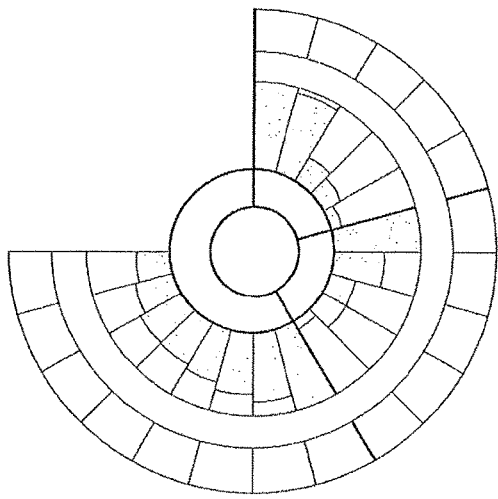
Figure 9J:
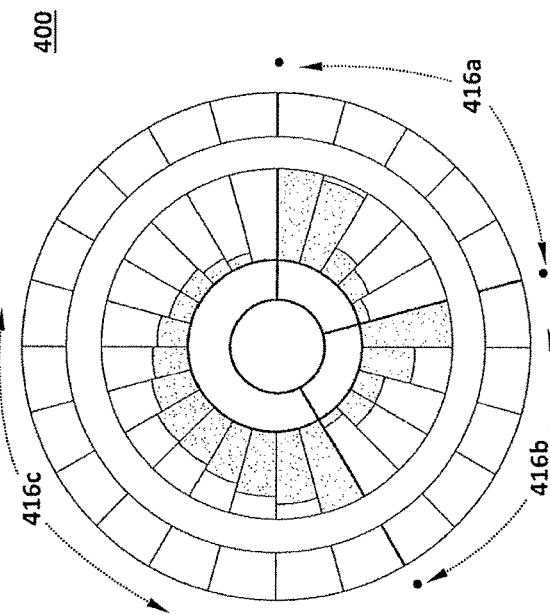
Figure 9G:
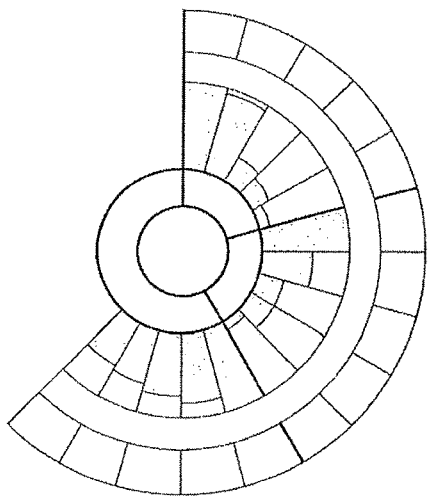
Figure 9I:
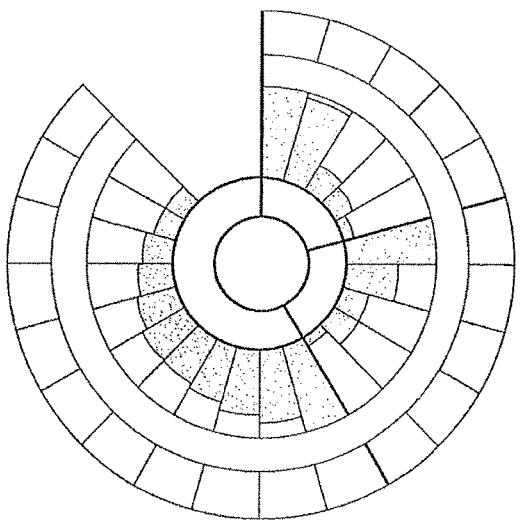

As illustrated in FIG. 9*b*, a rendering line 900 may extend outwardly (e.g., Direction A) from the center portion 402 (e.g., at the 3 o'clock position). Once extended, the rendering line 900 may pivot about a center axis 902 (e.g., the center of the center portion 402) in a circular motion in, for example, a clockwise direction (Direction B) or counter-clockwise direction (opposite Direction B). As the rendering line 900 travels, the concentric rings 406, 408, 410 are rendered in its wake, effectively generating the simulation that the rendering line 900 is painting the multi-dimensional donut 400 as it pivots about the center axis 902. FIGS. 9*c* though 9*j* illustrate the multi-dimensional donut 400 in various stages or renderings. The rendering time, which generally refers to the time in which it takes to render the multi-dimensional donut 400 (or for the rendering line 900 to complete the rotation), may be set by the provider of the system or by the user. For example, the rendering time may be set to be between 0.01 to 5.0 seconds, or more preferably, from 0.01 to 1.0 seconds. Once the image portion has been rendered (e.g., FIG. 9*j*), any textual data may be added to the multi-dimensional donut 400. Alternatively, the textual data may be gradually rendered as the concentric rings 406, 408, and 410 are rendered.

Figure 10:
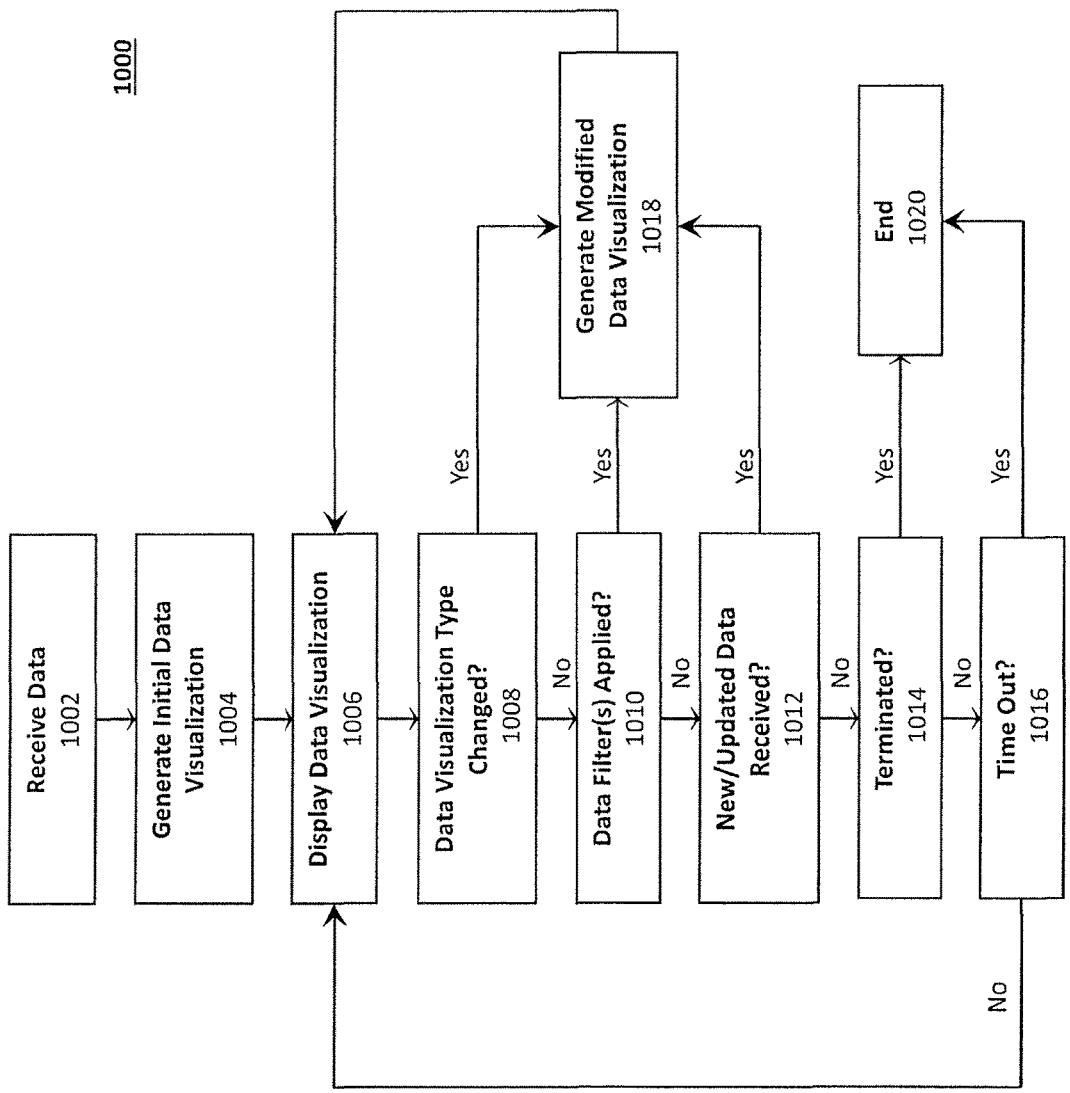
FIG. 10 illustrate an example flow diagram for dynamically updating the data visualization element.

FIG. 10 illustrates an example flow diagram 100 for dynamically updating the data visualization element. At Step 1002, a dataset may be received from a database. At Step 1004, the processor may convert the dataset into an initial data visualization. At Step 1006, the initial data visualization may be displayed via a computer device.

At Step 1008, the processor determines whether the data visualization type has been changed (e.g., from a multi-dimensional donut 400 to a data table 500, or vice versa). If yes, the processor re-renders the dataset to conform with the updated data visualization type at Step 1018, whereby the updated data visualization is then displayed at Step 1006. If not, the process continues to Step 1010.

At Step 1010, the processor determines whether a filter (a new dimension or filter) has been applied. If yes, the processor re-renders the data visualization element to conform with (or reflect) the filtering at Step 1018, whereby the updated data visualization is then displayed at Step 1006. If not, the process continues to Step 1012.

At Step 1012, the processor determines whether a new dataset, or portion thereof, has been received. If yes, the processor re-renders the data visualization element to conform with (or reflect) the update at Step 1018, whereby the updated data visualization is then displayed at Step 1006. If not, the process continues to Step 1014.

At Step 1014, the processor determines whether the visualization system has been terminated. If yes, the process terminates at Step 1020. If not, the process continues to Step 1016.

At Step 1014, the processor determines whether the visualization system has timed-out (e.g., due to inactivity). If yes, the process terminates at Step 1020. If not, the process continues to display the current data visualization at Step 1006.

Contact Relationship Management.

The foregoing systems and methods may be further employed to facilitate a contact relationship management (CRM) system, which may be used to manage an entity's interactions with current and future contacts. The CRM system may be used to organize, automate and synchronize, for example, sales, marketing, customer service, and technical support. Thus, a CRM system may, for example, provides information about a contact, or group of contacts, relating to, for instance, contact interactions, contact activities, contact interests and/or contact news. More specifically, with regard to contact interactions, the CRM system may track and organize interactions with the contact including, without limitation, meetings, call reports, RC activity, introductions, etc. The CRM system may track and organize interests of a contact, such as, research areas, roadshows, memberships, clubs, skills, etc. Further, the CRM system may track and organize activities of the contact, such as call logs, profile looks up and/or directories, and other search functionalities. Finally, the CRM system may track and organize news regarding a contact, such as new reports, articles, moves, promotions, personal changes (e.g., name changes due to marriage, death, birth of a child, etc.). The foregoing may be accumulated from a plurality of data sources (e.g., databases) and merged to provide personal and relevant insights. For example, the CRM system may be configured to automatically monitor telephone usage by automatically detecting a phone number and matching it to a contact. The matched contact may then pop up on the user's screen in sub-seconds as a contact card with a stream of all recent insights for that client. The user of the CRM system may then enter (or attach) any notes, images, videos, etc. directly at the point of interaction (e.g., the pop up). The CRM system may further employ search functionality, to located and display a contact. The CRM system may further employ notifications, for example, in real time, to provides changes, updates (e.g., personal or career), or other activities associated with a particular contact, or group of contacts.

The above-cited patents and patent publications are hereby incorporated by reference in their entirety. Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the invention may therefore be practiced otherwise than as specifically described above.

What is claimed is:

1. An interactive visualization system for presenting information, the system comprising:

An interactive visualization system for presenting information, the system comprising:
  a data storage device;
  a computing device configured to communicate data over a communication network;
  a display;
  a user input device, the user input device being configure to receive an input from a user; and
  a processor operatively coupled to a memory device, said data storage device, said computing device, said display, and user input device,
    wherein said processor is configured to execute computer instructions stored to said data storage device,
    wherein said processor identifies a dataset from data received, via said computing device, from one or more data sources,
    wherein said processor processes said computer instructions to render a data visualization graphical user interface on the display, the data visualization graphical user interface having a first visualization area and a second visualization area,
    wherein said processor renders a first data visualization element and a second data visualization element based at least in part on the dataset, the first data visualization element being displayed at said first visualization area, and the second data visualization element being displayed at said second visualization area,
    wherein the first data visualization element comprises a plurality of user selectable regions, each of said plurality of user selectable regions representing a portion of the dataset,
    wherein said processor dynamically re-renders the first data visualization element and the second data visualization element in response to the user selecting a first user selectable region,
    wherein the first data visualization element and the second data visualization element are dynamically re-rendered based at least in part on a portion of the dataset represented by the selected first user selectable region
    wherein the first data visualization element is a data table and each of said the plurality of user selectable regions represent a sub-category,
    wherein the plurality of user selectable regions are grouped into clusters, including a first cluster representing a first dimensional category, and a second cluster representing a second dimensional category, and
    wherein the data visualization graphical user interface comprises a dimension cross selector element having a plurality of rows intersecting a plurality of columns, each of said plurality of rows and each of said plurality of columns representing a dimensional category, whereby the user identifies the first dimensional category and the second dimensional category by selecting the point whereby a desired first dimension intersects a desired second dimension.

2. The interactive visualization system of claim 1, wherein the first data visualization element is a multi-dimensional donut.

3. The interactive visualization system of claim 2, wherein the multi-dimensional donut comprises a center region and a plurality of concentric rings axially disposed around the center portion.

4. The interactive visualization system of claim 3, wherein each of said plurality of concentric rings represents a data visualization component or a description label for each portion of the dataset being represented by the multi-dimensional donut.

5. The interactive visualization system of claim 3, wherein said plurality of concentric rings comprises: a first concentric ring that renders a data visualization component for each of said portions of the dataset; a second concentric ring that renders a numeric value for each of said portions of the dataset, said numeric value corresponding to the data visualization component; and a third concentric ring that displays a description label for each of said portions of the dataset.

6. The interactive visualization system of claim 3, wherein the plurality of user selectable regions, each user selectable region representing a sub-category, are grouped into a first plurality of clusters, each cluster representing a dimensional category.

7. The interactive visualization system of claim 6, wherein said plurality of concentric rings comprises: a first concentric ring that renders a data visualization component for each of said sub-categories; a second concentric ring that renders a numeric value for each of said sub-categories, said numeric value corresponding to the data visualization component; a third concentric ring that displays a description label for each of said sub-categories; and a fourth concentric ring that displays a dimensional category label for each of said clusters.

8. The interactive visualization system of claim 7, wherein the center region numerically represents a total amount for a dataset being represented by the multi-dimensional donut at a given time, the total amount being substantially equal to the sum of each sub-category within a dimensional category at the given time.

9. The interactive visualization system of claim 7, wherein the plurality of user selectable regions within a cluster are radially arranged around the center portion in a predetermined sorting order.

10. The interactive visualization system of claim 9, wherein the predetermined sorting order is: (1) alphabetically by description label; (2) ascending, by numeric value; or (3) descending, by numeric value.

11. The interactive visualization system of claim 6, wherein the data visualization graphical user interface comprises a flip icon, whereby selecting said flip icon causes said processor to dynamically re-render the first data visualization element with a second plurality of clusters, in lieu of the first plurality of clusters.

12. The interactive visualization system of claim 11, wherein the selected first user selectable region is selected from a cluster chosen from said first plurality of clusters, and a second user selectable region is selected from a cluster chosen from said second plurality of clusters.

13. The interactive visualization system of claim 12, wherein the first data visualization element and the second data visualization element are dynamically re-rendered based at least in part on a portion of the dataset represented by the selected first user selectable region and the selected second user selectable region.

14. The interactive visualization system of claim 1, wherein the data visualization graphical user interface comprises a filter selector element, the filter selector element being configured to apply a desired filter to said first data visualization element or said second data visualization element.

15. The interactive visualization system of claim 1, wherein the second data visualization element comprises one or more detailed data tables.

16. The interactive visualization system of claim 3, wherein one or more of said plurality of concentric rings are gradually rendered about a center axis positioned at the center region's center.

17. An interactive visualization system for presenting information, the system comprising:
a data storage device;
a computing device configured to communicate data with a computing device over a communication network; and
a computer operatively coupled to said data storage device, said computing computing device, and configured to generate computer instructions, wherein said computer instructions are configured to instruct the computing device to:
render a data visualization graphical user interface on a display, the data visualization graphical user interface having a visualization area;
render a data visualization element based at least in part on a dataset received from one or more data sources, the data visualization element being displayed at said visualization area,
wherein the data visualization element comprises a plurality of user selectable regions, each of said plurality of user selectable regions representing a portion of the dataset; and
dynamically re-render the data visualization element in response to the user selecting a first user selectable region,
wherein the data visualization element is dynamically re-rendered based at least in part on a portion of the dataset represented by the selected first user selectable region,
wherein the data visualization element is a data table and each of said
plurality of user selectable regions represent a sub-category,
wherein the plurality of user selectable regions are grouped into clusters, including a first cluster representing a first dimensional category, and a second cluster representing a second dimensional category, and
wherein the data visualization graphical user interface comprises a dimension cross selector element having a plurality of rows intersecting a plurality of columns, each of said plurality of rows and each of said plurality of columns representing a dimensional category, whereby the user identifies the first dimensional category and the second dimensional category by selecting the point whereby a desired first dimension intersects a desired second dimension.

18. The interactive visualization system of claim 17, wherein the data visualization element is a multi-dimensional donut having a center region and a plurality of concentric rings axially disposed around the center portion.

19. The interactive visualization system of claim 18, wherein each of said plurality of concentric rings represents a data visualization component or a description label for each portion of the dataset being represented by the multi-dimensional donut.

20. The interactive visualization system of claim 18, wherein said plurality of concentric rings comprises: a first concentric ring that renders a data visualization component for each of said portions of the dataset; a second concentric ring that renders a numeric value for each of said portions of the dataset, said numeric value corresponding to the data visualization component; and a third concentric ring that displays a description label for each of said portions of the dataset.

21. The interactive visualization system of claim 18, wherein the plurality of user selectable regions, each user selectable region representing a sub-category, are grouped into a first plurality of clusters, each cluster representing a dimensional category.

22. The interactive visualization system of claim 21, wherein the data visualization graphical user interface comprises a flip icon, whereby selecting said flip icon causes said processor to dynamically re-render the first data visualization element with a second plurality of clusters, in lieu of the first plurality of clusters.

23. The interactive visualization system of claim 22, wherein the selected first user selectable region is selected from a cluster chosen from said first plurality of clusters, and a second user selectable region is selected from a cluster chosen from said second plurality of clusters.

24. The interactive visualization system of claim 23, wherein the first data visualization element and the second data visualization element are dynamically re-rendered based at least in part on a portion of the dataset represented by the selected first user selectable region and the selected second user selectable region.

25. The interactive visualization system of claim 18, wherein one or more of said plurality of concentric rings are gradually rendered about a center axis positioned at the center region's center.

26. A computer-implemented process for presenting information, the computer-implemented process comprising:
- retrieving, using one or more computers, data from a non-transitory storage device;
- identifying, using the one or more computers, a dataset from said data to be presented;
- generating, using the one or more computers, computer instructions;
- outputting, using the one or more computers, said computer instructions to a computing device over a communication network,
- wherein said computer instructions are configured to instruct the computing device to:
- (i) render, using a processor, a data visualization graphical user interface on a display, the data visualization graphical user interface having a visualization area;
- (ii) render, using the processor, a data visualization element based at least in part on the dataset, the data visualization element being displayed at said visualization area,
- wherein the data visualization element comprises a plurality of user selectable regions, each of said plurality of user selectable regions representing a portion of the dataset; and
- (iii) dynamically re-render, using the processor, the data visualization element in response to selection of a first user selectable region,
- wherein the data visualization element is dynamically re-rendered based at least in part on a portion of the dataset represented by the selected first user-selectable region
- wherein the first data visualization element is a data table and each of said the plurality of user selectable regions represent a sub-category,
- wherein the plurality of user selectable regions are grouped into clusters, including a first cluster representing a first dimensional category, and a second cluster representing a second dimensional category, and
- wherein the data visualization graphical user interface comprises a dimension cross selector element having a plurality of rows intersecting a plurality of columns, each of said plurality of rows and each of said plurality of columns representing a dimensional category, whereby the user identifies the first dimensional category and the second dimensional category by selecting the point whereby a desired first dimension intersects a desired second dimension.

27. The computer-implemented process of claim 26, wherein the data visualization element is a multi-dimensional donut having a center region and a plurality of concentric rings axially disposed around the center portion, each of said plurality of concentric rings representing a data visualization component or a description label for each portion of the dataset being represented by the multi-dimensional donut.

28. The computer-implemented process of claim 27, wherein said plurality of concentric rings comprises: a first concentric ring that renders a data visualization component for each of said portions of the dataset; a second concentric ring that renders a numeric value for each of said portions of the dataset, said numeric value corresponding to the data visualization component; and a third concentric ring that displays a description label for each of said portions of the dataset.

29. The computer-implemented process of claim 27, wherein the plurality of user selectable regions, each user selectable region representing a sub-category, are grouped into a first plurality of clusters, each cluster representing a dimensional category.

30. The computer-implemented process of claim 29, wherein the data visualization graphical user interface comprises a flip icon, whereby selecting said flip icon causes said processor to dynamically re-render the first data visualization element with a second plurality of clusters, in lieu of the first plurality of clusters.

31. The computer-implemented process of claim 30, wherein the selected first user selectable region is selected from a cluster chosen from said first plurality of clusters, and a second user selectable region is selected from a cluster chosen from said second plurality of clusters.

32. The computer-implemented process of claim 31, wherein the first data visualization element and the second data visualization element are dynamically re-rendered based at least in part on a portion of the dataset represented by the selected first user selectable region and the selected second user selectable region.

33. The computer-implemented process of claim 27, wherein one or more of said plurality of concentric rings is gradually rendered about a center axis positioned at the center region's center.

* * * * *